Jan. 5, 1937.  E. M. BOUTON ET AL  2,066,907
SIGNAL AND CONTROL SYSTEM FOR ELEVATORS
Original Filed July 10, 1934  8 Sheets-Sheet 1

WITNESSES:

INVENTORS.
Edgar M. Bouton &
Harold W. Williams.
BY
ATTORNEY

Jan. 5, 1937.  E. M. BOUTON ET AL  2,066,907
SIGNAL AND CONTROL SYSTEM FOR ELEVATORS
Original Filed July 10, 1934  8 Sheets-Sheet 2
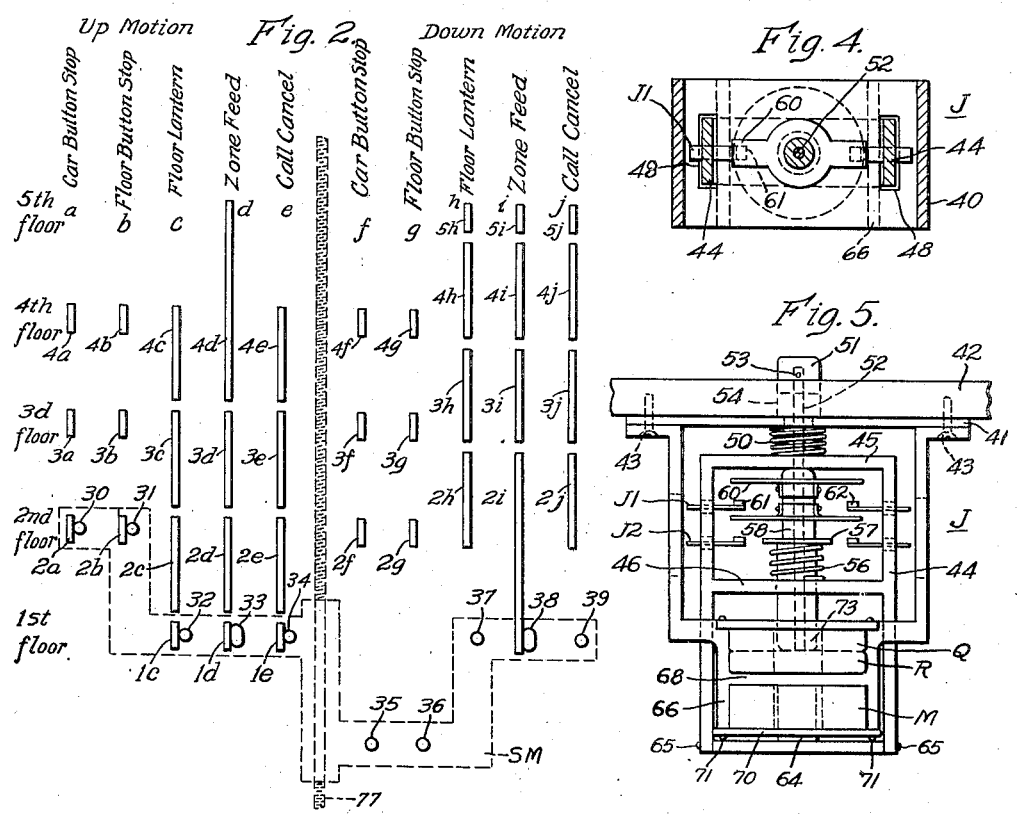
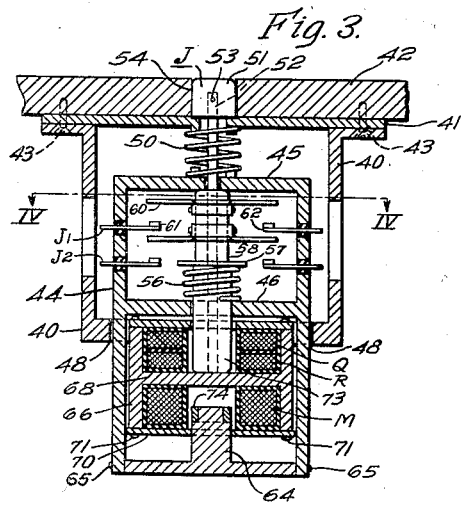
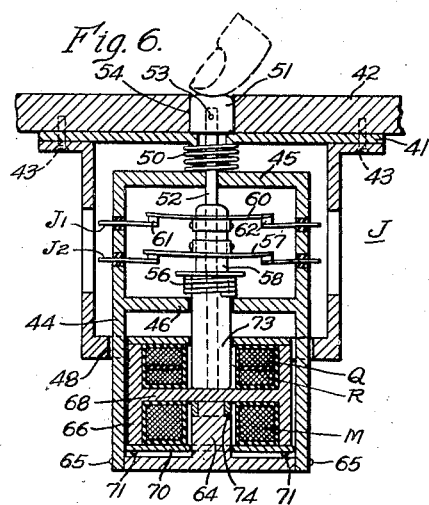
WITNESSES:
INVENTORS.
Edgar M. Bouton &
Harold W. Williams.
BY
ATTORNEY

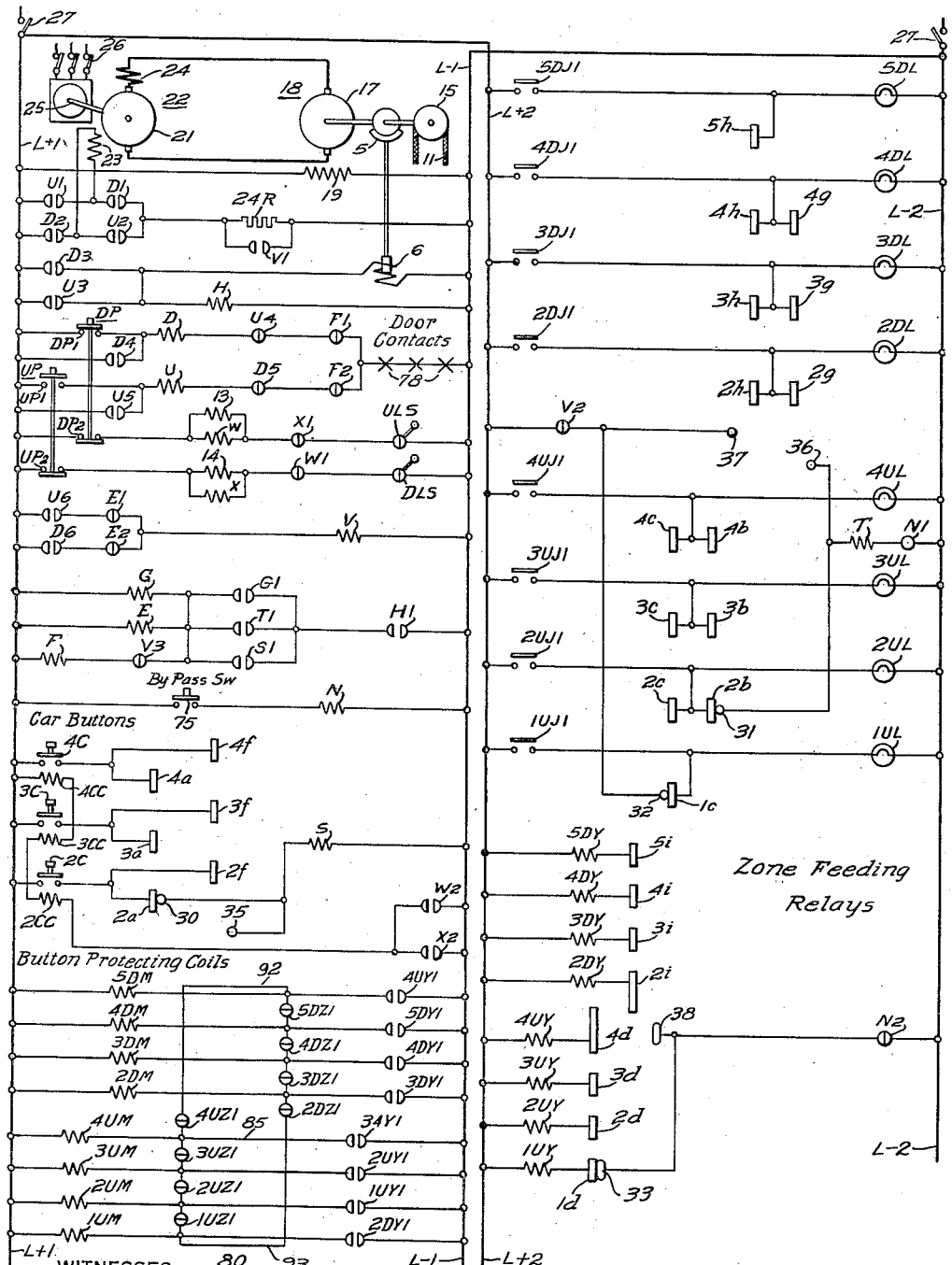

Jan. 5, 1937.   E. M. BOUTON ET AL   2,066,907
SIGNAL AND CONTROL SYSTEM FOR ELEVATORS
Original Filed July 10, 1934   8 Sheets-Sheet 6
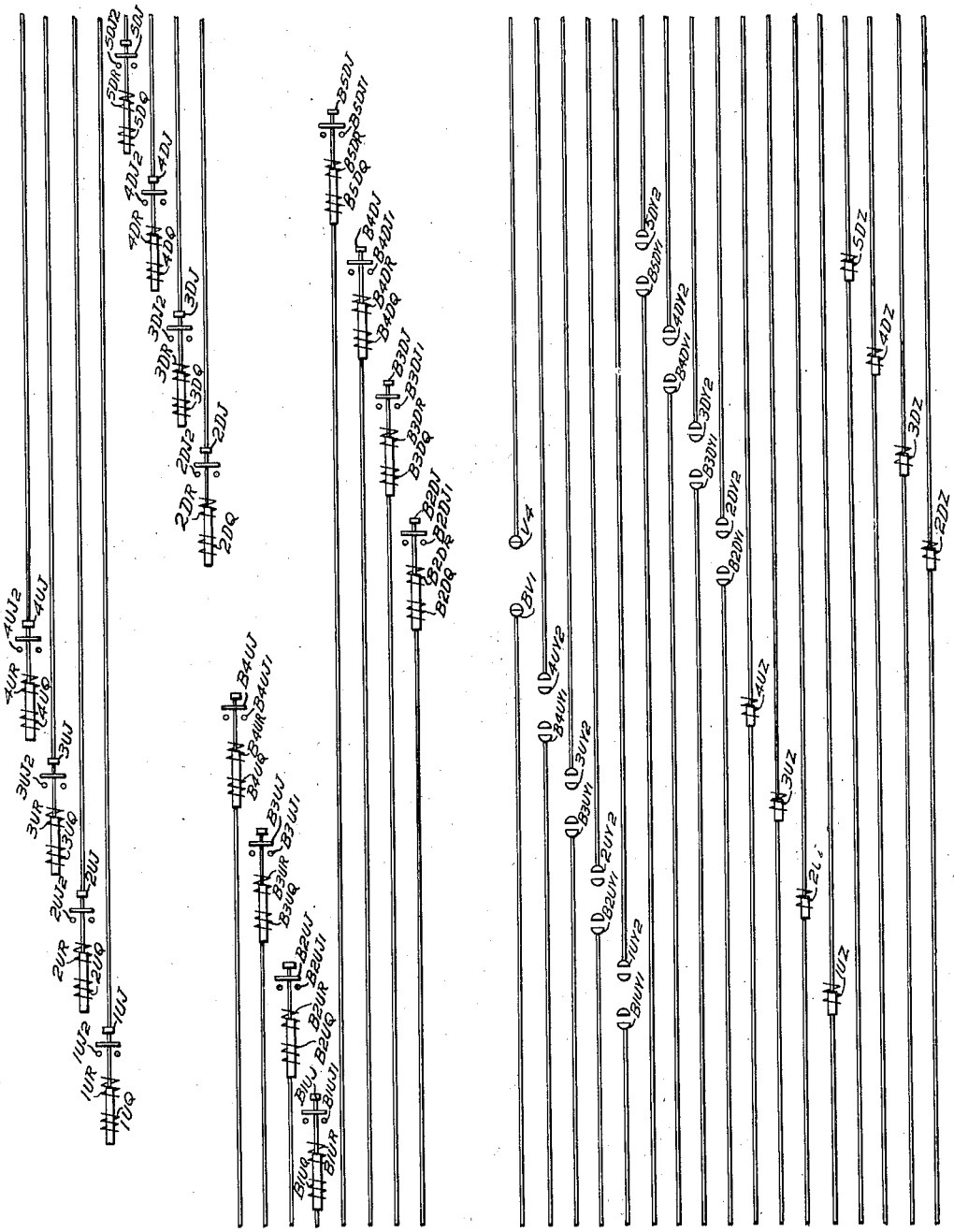
Fig. 8.A.
WITNESSES:
INVENTORS.
Edgar M. Bouton &
Harold W. Williams.
BY
ATTORNEY Jan. 5, 1937.   E. M. BOUTON ET AL   2,066,907
SIGNAL AND CONTROL SYSTEM FOR ELEVATORS
Original Filed July 10, 1934    8 Sheets-Sheet 7

WITNESSES:
C. J. Weller.
Birney Hines.

INVENTORS.
Edgar M. Bouton &
Harold W. Williams.
BY
ATTORNEY

Jan. 5, 1937.  E. M. BOUTON ET AL  2,066,907
SIGNAL AND CONTROL SYSTEM FOR ELEVATORS
Original Filed July 10, 1934  8 Sheets-Sheet 8

WITNESSES:

INVENTORS.
Edgar M. Bouton &
Harold W. Williams.
BY
ATTORNEY

Patented Jan. 5, 1937

2,066,907

UNITED STATES PATENT OFFICE 2,066,907

SIGNAL AND CONTROL SYSTEM FOR ELEVATORS

Edgar M. Bouton and Harold W. Williams, Chicago, Ill., assignors to Westinghouse Electric Elevator Company, Chicago, Ill., a corporation of Illinois Application July 10, 1934, Serial No. 734,498
Renewed September 24, 1935

25 Claims. (Cl. 187—29)

Our invention relates to signal and control systems for elevators, and more particularly to such signal and control systems as may be employed for operating a bank of elevator cars.

One object of our invention is to provide a signal and control system which will promote the answering of calls and the loading and unloading of passengers in the most prompt and efficient manner.

Another object is to provide, in an elevator system having individual stopping buttons for each car at each floor, for projecting the button corresponding to the nearest approaching car to indicate to the waiting passengers which button should be pressed to stop the nearest approaching car for the direction they desire to travel.

Another object is to provide, in an elevator system having a stop push-button for each car for each direction at each floor, for withdrawing and rendering inoperative all of the push buttons at each floor except the push button for the nearest approaching car.

A further object is to provide an elevator signal and control system in which a car attendant in a car may by-pass a stop signal and immediately transfer it to the next approaching car.

A further object is to provide a by-pass system which will immediately notify a waiting passenger when his stop signal is transferred to another car so that the passenger may at once move to the door for that car and be ready to board it when it arrives.

It is also an object to provide an elevator system in which a car attendant may by-pass floor stop signals and cause any floor stop signals already registered to be immediately transferred to the next approaching car, at the same time extinguishing the lighted floor lanterns of the car making the transfer and immediately lighting the floor lanterns for the next approaching car at the floors where stop signals are registered.

In order to accomplish these and other objects, we have provided an elevator system embodying a group of cars and a signal and control system therefor having the following characteristics and functions.

Each car in the group may be started by means of an "up" starting and a "down" starting push button in the car and may be stopped by "stop" push buttons in the car or by stop-signal push buttons at the floor landings. Each car has its own stopping push buttons at the floor landings; that is, a plurality of "stop" push buttons will be disposed at each floor, an "up" button and a "down" button for each car.

Each button will be provided with means by which it may be withdrawn, that is, pulled into its casing, when the car to which it corresponds is not the nearest approaching car and the push button for the nearest approaching car will be projected or pushed out so that it will be noticed by the waiting passenger and may be operated by him to stop the nearest approaching car.

At any given time at any given floor only one "up" direction and one "down" direction button will be projected outwardly thereby indicating to the waiting passengers which buttons are ready for operation for the purpose of stopping the nearest approaching cars in both directions.

The withdrawal and projection of the floor push buttons will be controlled by the operation of the cars. Each car will cause the projecting of all of its own push buttons at the floors in advance of its motion up to the floor corresponding to the car ahead. The buttons for the other cars at these floors will be withdrawn out of position for operation.

When a car approaches a terminal which the car ahead of it has left, the approaching car will project its own push buttons not only at the floors between itself and the terminal but also its own push buttons away from the terminal to the floor corresponding to the car ahead.

For a better understanding of our invention, reference may be had to the accompanying drawings, in which, Figure 1 is a diagrammatic representation of an elevator installation embodying our improved signal and control system.

Fig. 2 is an enlarged representation of the contact segments and cooperating contact brushes on one of the floor selectors for one of the cars shown in Fig. 1, the brushes being shown in the position they assume when the car is stopped at the first floor.

Fig. 3 is a view, partly in side elevation but mainly in cross section, of our improved push button structure embodied in the elevator system illustrated in Fig. 1, with the push button in its normal position.

Fig. 4 is a view taken on the line IV—IV of Fig. 3.

Fig. 5 is a view similar to Fig. 3 with the push button in a projected position ready for operation by a waiting passenger.

Fig. 6 is also a view similar to Fig. 3 but showing a push button at the end of its operation by a waiting passenger.

Figure 1:
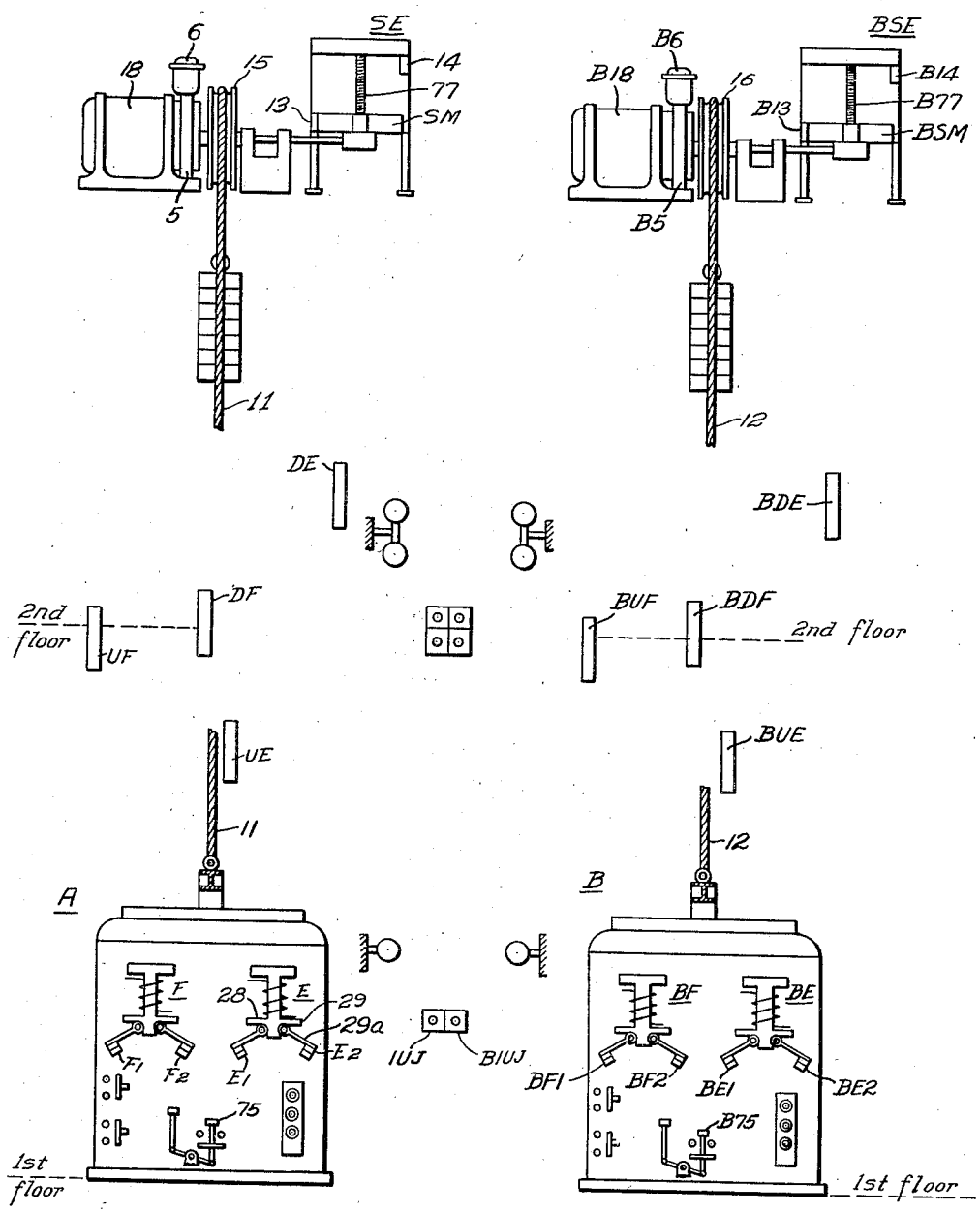
Figure 7A:
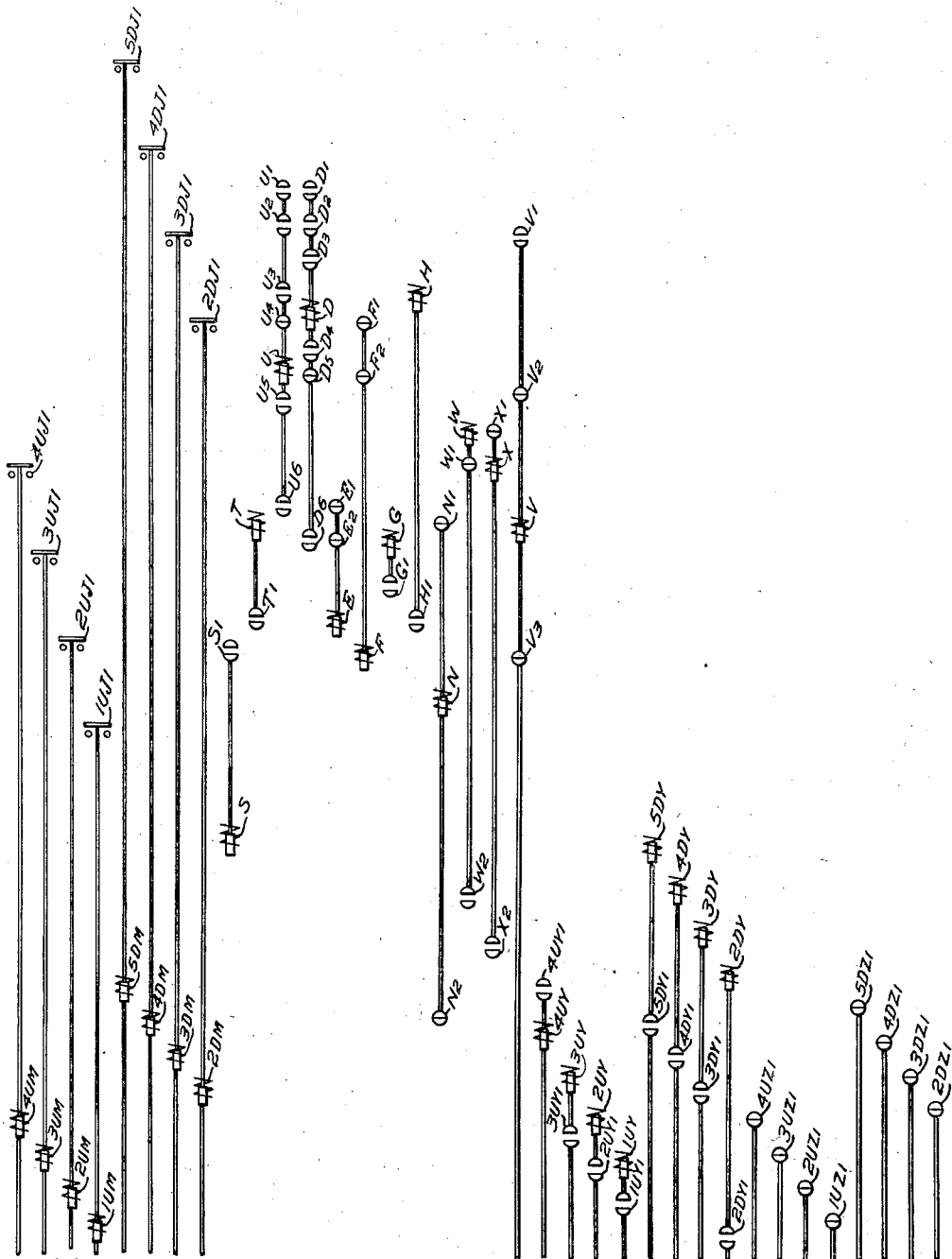
Figure 8:
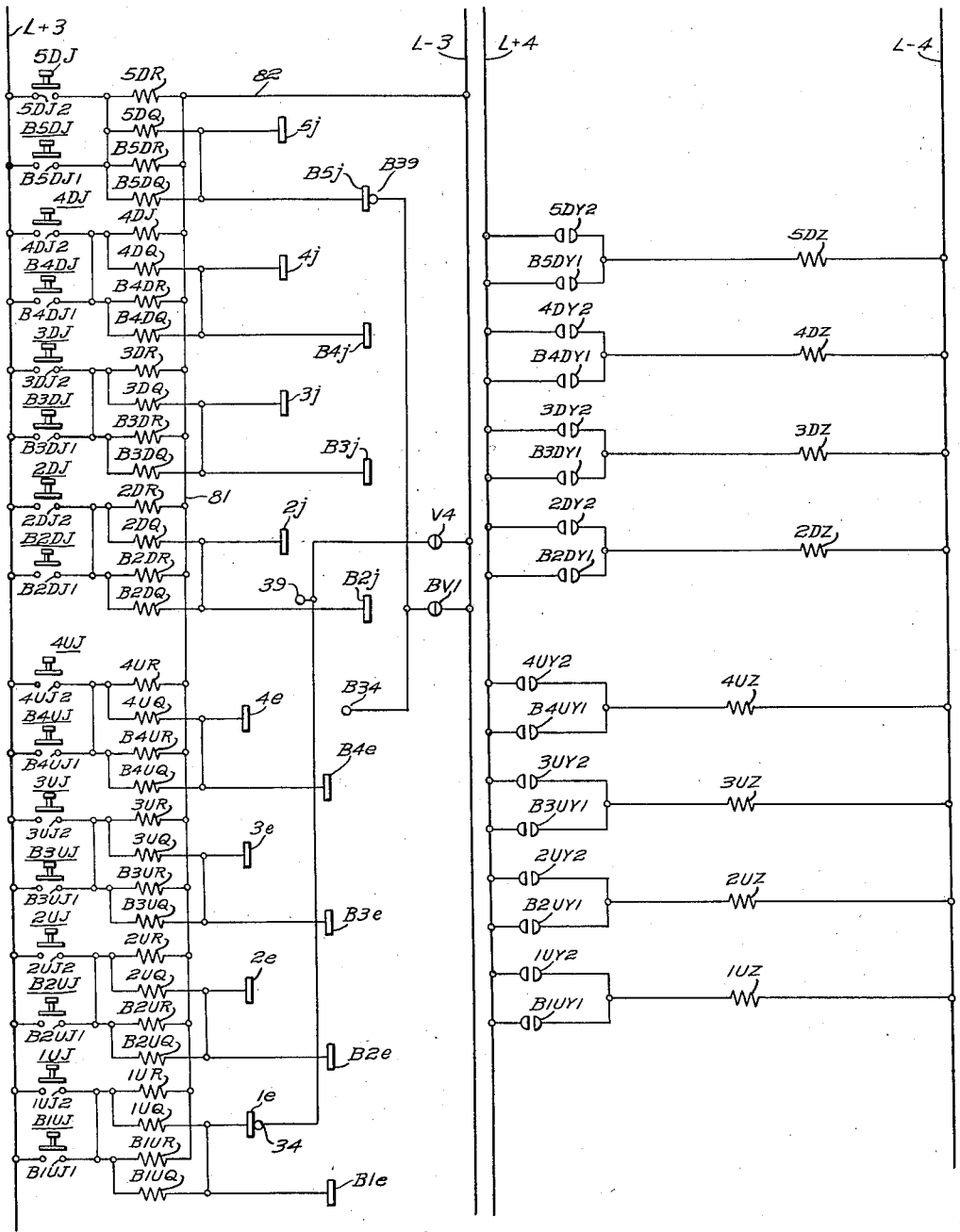
Figure 9:
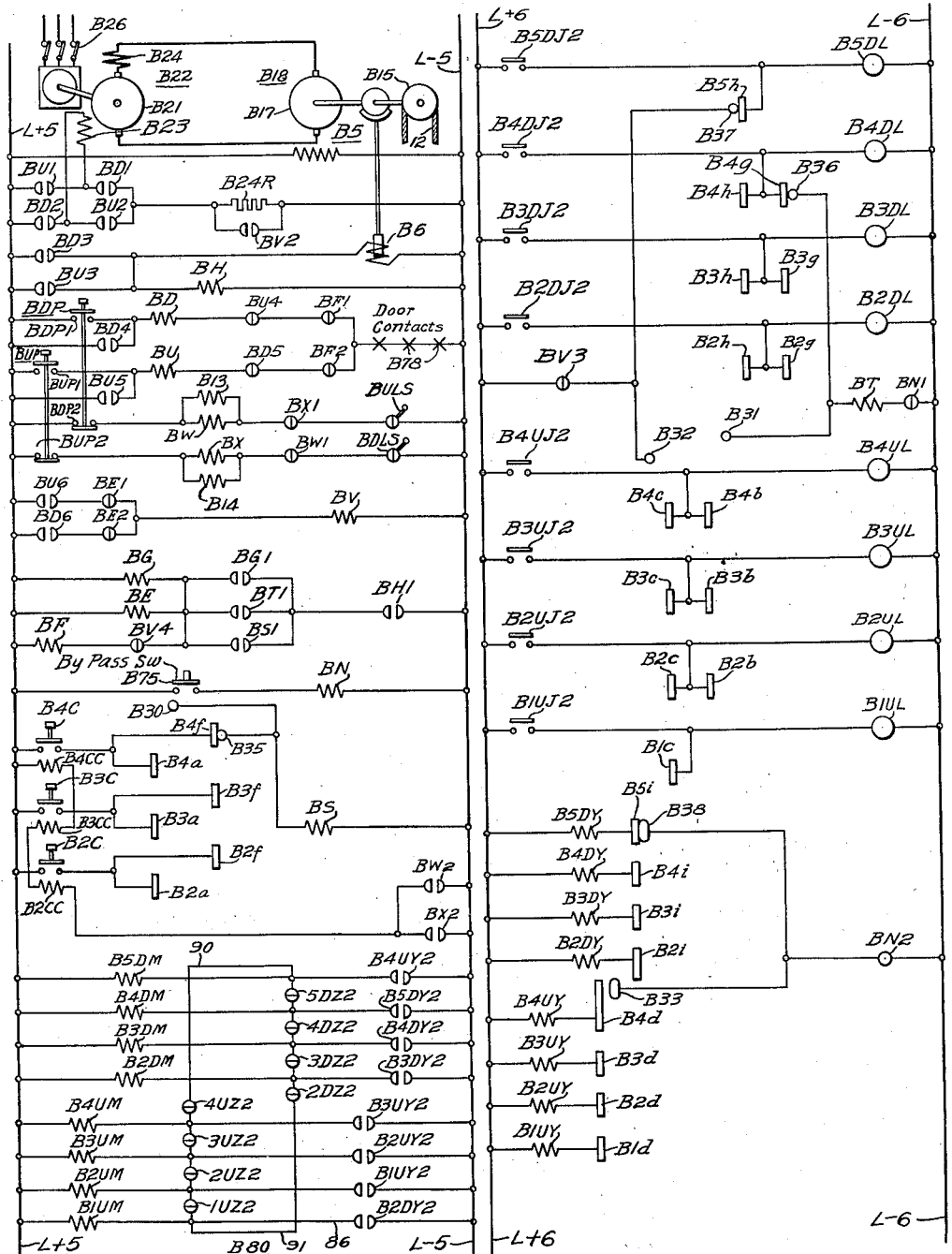
Figure 9A:
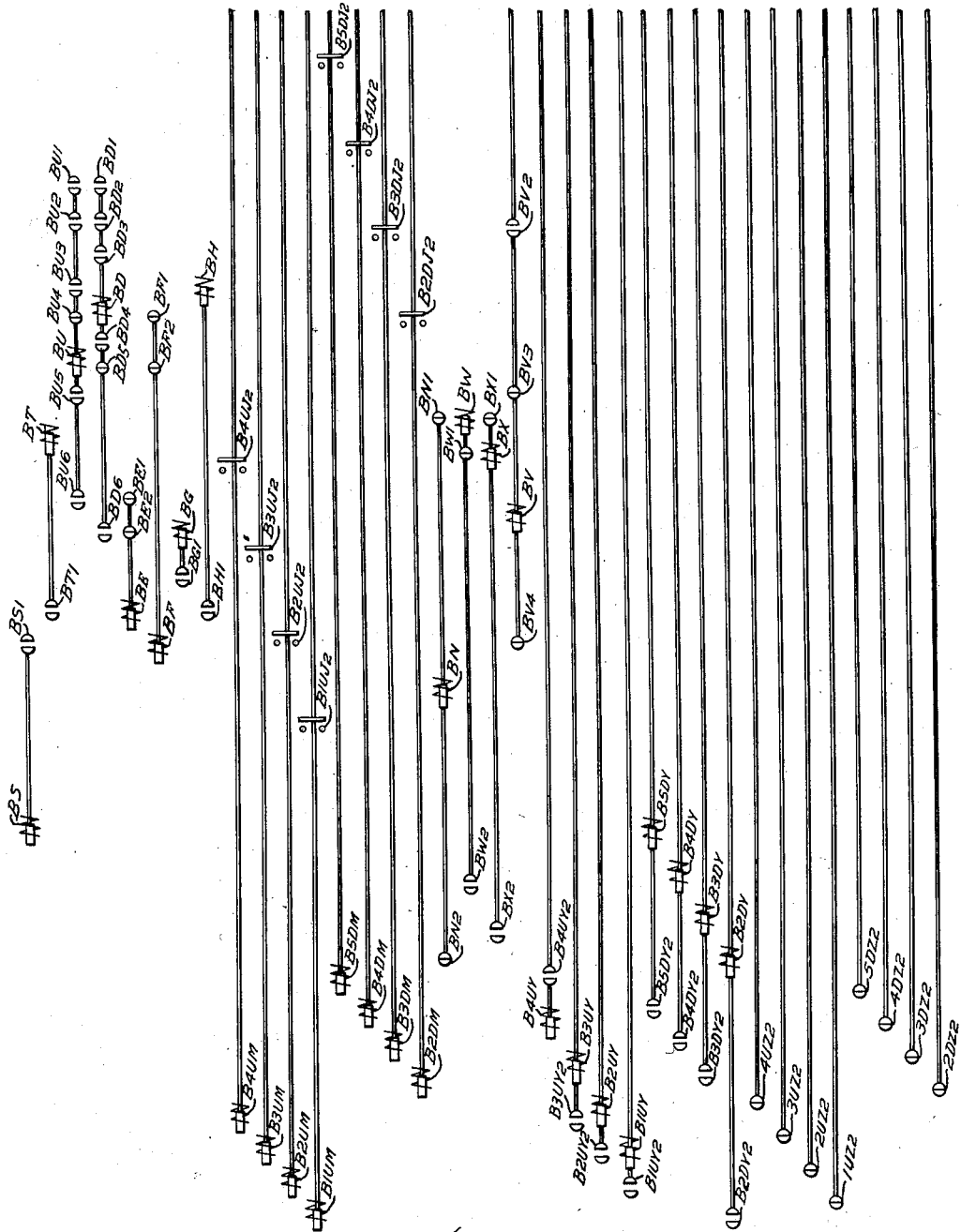

Figs. 7, 8 and 9 collectively constitute a diagrammatic representation, in what is known as the straight line style, of the signal and control system embodied in operating the elevator cars shown in Fig. 1; and Figs. 7A, 8A and 9A collectively constitute an explanatory illustration of the relays embodied in Figs. 7, 8 and 9.

The illustration of the relays in Figs. 7A, 8A and 9A shows their coils and contact members disposed in horizontal alinement with their positions in the straight line circuits of Figs. 7, 8 and 9, so that the reader may readily determine the identification of any relay, the number and kind of its contact members and the position of its coil and its contact members in the straight line circuits.

For convenience in reading the drawings, Fig. 8 should be placed under Fig. 7, Fig. 9 under Fig. 8, Fig. 7A beside Fig. 7, Fig. 8A beside Fig. 8 and under Fig. 7A, and Fig. 9A beside Fig. 9 and under Fig. 8A.

Referring more particularly to the drawings, I have illustrated an elevator system embodying two cars A and B for serving five floors or landings. The cars are suitably suspended by cables 11 and 12 which pass over hoisting drums 15 and 16 respectively.

Although we have shown only two cars and a signal and control system therefor as applied to only five floors, it is to be understood that our invention may be used for any number of cars operating past any number of floors.

For convenience, the main relays included in the system are designated as follows:

C = Stop push buttons in car A.
CC = Holding coils for the push buttons in car A.
D = Down direction switch for car A.
E = Inductor relay for decelerating car A.
F = Inductor relay for stopping car A.
G = Relay for maintaining inductor relays for car A in operated condition.
H = Relay for restoring inductor relays of car A.
J = Push buttons at floors.
L = Floor lanterns for indicating cars will stop.
M = Coils for projecting floor push buttons.
N = By-passing relay for car A.
P = Push button starting switch in car A.
Q = Cancelling coils on the floor push buttons.
R = Stop call registering coils on the floor push buttons.
S = Car button stopping relay for car A.
T = Floor button stopping relay for car A.
U = Up direction switch for car A.
V = High speed relay for car A.
W = Up direction preference relay for car A.
X = Down direction preference relay for car A.
Y = Zone feeding relays for car A.
Z = Zone relays common to both cars.

The relays for car B are given the same designation as those for car A with the letter B prefixed thereto, the letters U and D indicate up and down direction. The prefix numerals indicate the floors and the suffix numerals indicate the contact members of the relays. For instance, the reference B2DJ means the floor push button J for car B for the down direction at the second floor, and the reference B2DJ1 indicates one of the contact members of that push button.

Referring to the control system for car A as shown in Figs. 7 and 8, the hoisting drum 15 is directly coupled to an armature 17 of a suitable hoisting motor 18, the field winding 19 of which is connected, for constant voltage energization, to a source of supply designated by the supply conductors L+1 and L−1.

A variable voltage system of control may be provided for operating the hoisting motor 18 wherein the armature 17 is connected in a closed circuit with the armature 21 of a generator 22. The generator is provided with a separately excited field winding 23 and a cumulative series field winding 24. A resistor 24R is connected in the circuit of a separately excited field winding 23 for controlling the speed of the generator. The armature 21 of the generator may be driven by a suitable driving motor 25 which may be connected to a suitable source of supply, as represented by the conductors and switch 26.

A brake 5 operated by a brake magnet 6 is provided for applying a braking effect to the hoisting drum 15 when the car is brought to a stop, the brake magnet 6 being energized to release the brake 5 when the car is running and being deenergized to apply the brake 5 when the supply of power to the car is cut off.

The direction and speed of the hoisting motor 18 may be suitably controlled by controlling the direction and the value of the excitation current that is supplied to the separately excited field winding 23 of the generator 22.

The direction of excitation current for the field winding 23 may be suitably controlled by means of an up direction switch U and a down direction switch D, while the value of the current supplied to the field winding may be controlled by means of a high speed relay V which controls the resistor 24R.

The operation of the up direction and the down direction switches U and D, as well as the high speed relay V, may be controlled by means of an up push button UP and a down push button DP that are mounted in the car in position to be actuated by the car attendant.

Any suitable means may be employed for automatically stopping the car A level with the floor it serves. As an example of such means, I have illustrated an automatic inductor relay landing system similar to that disclosed in Patent No. 1,884,446, issued October 25, 1932 to K. M. White and G. K. Hearn, and assigned to the Westinghouse Electric Elevator Company.

The landing system for car A includes a decelerating inductor relay E and a stopping inductor relay F for causing the car to be automatically decelerated from its high speed and brought to a stop at an exact level with the floor. The decelerating inductor relay E is mounted on the car A in position to cooperate with an inductor plate UE for the up direction and an inductor plate DE for the down direction. The stopping inductor relay F is mounted on the car A in position to cooperate with an inductor plate UF for the up direction and an inductor plate DF for the down direction. The inductor plates are constructed of magnetic material and are mounted in the hatchway in such position as to cooperate with and open the contact members of the inductor relays on the car when the relays are in an energized condition as the car approaches a stop at a landing.

For simplicity, only one set of inductor plates for one floor have been shown, but it will be understood that a set similar to that shown may be provided for each floor served by the car intermediate the upper terminal landing and the lower terminal landing. If desired, a set of inductor plates corresponding to the inductor plates UE and UF may be provided for the upper terminal floor and a set corresponding to inductor plates DE and DF may be provided for the lower terminal floor.

As shown, each inductor relay is provided with two sets of contact members. For an "up" stop, the contact members E1 of the relay E cooperate with the inductor plate UE in decelerating the car, and the contact members F1 cooperate with the inductor plate UF in stopping the car after it is decelerated. For the down direction, the contact members E2 of relay E cooperate with the inductor plate DE to decelerate the car and the contact members F2 cooperate with the inductor plate DF in stopping the car.

The contact members of the inductor relays just described are so connected with the car control circuits that, when the inductor relays are energized to decelerate and stop the car at the floor represented by the inductor plates in the down direction, the contact members E2 pass the inductor plate DE and are thereby opened to decelerate the car, and as the contact members F2 come opposite the inductor plate DF they open to stop the car level with the floor. The contact members E1 of relay E and the contact members F1 of the relay F are opened by the inductor plates UE and UF respectively when the stop is to be made in the up direction.

The inductor relays are of the self-holding type, that is, when they are energized but have not yet come opposite an inductor plate, the contact members remain closed, but when the relay comes opposite an inductor plate, the contact members adjacent that plate move to an open position and are held in such open position until the inductor relay is deenergized. The means for holding the contact members in the open position on inductor relay E, for instance, are the extended portions 28 and 29 (Fig. 1).

For instance, it will be seen that when the inductor relay E passes the down inductor plate DE in an energized condition, the contact members E2 will be opened, and the arm 29a will be moved upwardly to such a position that they would be attracted and held by the magnetized projection 29. Therefore, the opened contact members remain open and do not reclose after passing the inductor plate to complicate the operation of the control system. However, we do not desire to be limited to inductor relays of this particular type because inductor relays with temporary opening contact members which are well known in the art may be employed just as readily if the motor control system is adjusted to cooperate with them.

When the inductor relays are energized to slow down the car to a stop, it is desired to maintain them in that condition until they are operated to bring the car to rest. A slow down holding relay G is provided for this purpose.

When the inductor relays are energized for a stop, they remain energized until restored even though their contact members are operated by passage near the inductor plates. Therefore, an inductor restoring relay H is provided for deenergizing the inductor relays of car A after a stop has been made and also for so interlocking them that they can be energized only while the car is moving.

In the elevator system illustrated in the drawings the energization of the inductor relays on car A for decelerating and stopping that car at a floor is effected either by a car button stopping relay S or by a floor button stopping relay T. The energization of either of these relays will, as the car nears a floor at which a stop is to be made, energize the inductor relays on that car and thereby cause it to decelerate and stop at that floor.

The car button stopping relay CS is controlled by a plurality of push buttons in the car, one for each floor. The pressing of a car button by a car attendant will register a stop call, or in other words, initiate and maintain a circuit which will be completed as the car arrives within a predetermined distance of the floor corresponding to the button and thereby energize the stopping relay S which will, in turn, energize the inductor relays to stop the car at that floor. In this manner, the car may be stopped at any floor by pressing the push button in the car for that floor.

The push buttons mounted in car A for operation by the car attendant when he desires to register stop calls to stop the car at the floors where passengers desire to get off, are designated as 2C, 3C and 4C for the second, third and fourth floors, respectively, no buttons being necessary for the lower terminal floor and the upper terminal floor because the car may be stopped by the usual well-known limit switches (not shown) as it approaches these terminals.

Associated with the respective car push buttons are car push-button holding or registering coils 2CC, 3CC and 4CC. These coils operate to hold the car push buttons in a depressed position after they are pressed by the car attendant in making stops from within the car. The coils are deenergized when the car reaches the terminals to release the buttons for the next direction of operation.

The stop car push buttons in car B are designated as B2C, B3C and B4C and the holding coils therefor are designated as B2CC, B3CC and B4CC.

The floor button stopping relay T is controlled by a plurality of push buttons at the floor landings, for each direction for each car at each floor landing. The pressing of a push button at a floor for a car will register, or, in other words, initiate and maintain a circuit which will be completed as that car nears that floor and thereby energize its stopping relay T to energize the inductor relays to stop the car at such floor.

The push buttons disposed at the floor landings to enable waiting passengers to stop the cars are designated as follows: The "up" buttons for car A are marked 1UJ, 2UJ, 3UJ and 4UJ for the first, second, third and fourth floors; the "down" buttons are marked 5DJ, 4DJ, 3DJ and 2DJ for the fifth, fourth, third and second floors. For car B, the "up" buttons at the first, second, third and fourth floors are marked B1UJ, B2UJ, B3UJ and B4UJ; and the "down" buttons at the fifth, fourth, third and second floors are marked B5DJ, B4DJ, B3DJ and B2DJ. Inasmuch as the cars do not go below the first floor, no "down" buttons are provided for the first floor. Similarly, inasmuch as the cars do not go above the fifth floor, no "up" buttons are provided for the fifth floor.

As shown in Figs. 3, 4, 5 and 6, we have provided a novel push button structure for each of the push buttons J at the floor landings. As shown, this structure is housed within a supporting body 40 and a bearing plate 41 mounted upon a face plate 42 by a plurality of screws 43.

The body 40 supports a slidable frame 44 provided with a head 45 and a central partition or wall 46. The legs of the frame extend through apertures 48 in the rear portion of the body 40 thereby supporting and guiding the movements of the frame within the body.

The outward movement of the frame is limited by movement of its head 45 against the bearing plate 41; inward movement is limited by the engagement of the wall 46 with the rear portion of the body 40. A coiled compression spring 50 is disposed between the head 45 and the bearing plate 41 to bias the slidable frame 44 toward its innermost position in the body 40. Hence, the frame will normally remain in its innermost position in the body unless it is forced outwardly against the biasing effect of the spring 50.

The push button J is slidably mounted in and supported by the sliding frame and comprises a button or cap 51 mounted on the outer end of a shaft 52 by means of a pin 53. The button is slidably seated in a depression 54 in the face plate and its shaft 52 extends inwardly through the bearing plate 41, the compression spring 50, the frame head 45, frame wall 46 to the wall 68 of the body.

The slender portion of the shaft 52 is slidably seated in the central portion of the head 45 and the rear end of the shaft is slidably seated and supported in the central portion of the partition or wall 46 to permit the push button to move inwardly and outwardly in the frame 44.

In order to bias the push button to an "out" position in the frame 44, a compression spring 56 is concentrically positioned on the shaft 52 between the wall 46 and a washer 57 firmly fixed to the shaft. The outer movement of the push button relative to the frame under the effect of the biasing spring 56 is limited by an insulating sleeve 58 mounted upon and firmly affixed to the central portion of the shaft 52 in position to impinge against the head 45 on the frame. The inner movement of the push button relative to the frame is limited by the spring 56 and the washer 57. Hence, if the frame is moved outwardly to the position shown in Fig. 5 it will carry the push button with it and hold it in such position that it can be pressed inwardly against the operation of the biasing spring 56 by finger pressure as shown in Fig. 6.

A pair of contact members J1 and J2 are mounted upon the push button for closing certain control circuits when the push button is moved inwardly in the sliding frame. The contact member J1 comprises a conducting bar 60 and individual contact members 61 and 62. The conducting bar 60 is provided with a large central portion which passes around and is firmly affixed to the push button as by riveting it to the insulating collar 58. The individual contact members 61 and 62 are firmly mounted in the side walls of the frame 44 in position to be engaged by the conducting bar 60 when the push button is moved inwardly relative to the frame, as shown in Fig. 6. The contact members J2 are similar to the contact members J1.

In order to effect an outward movement of the sliding frame 44 and carry with it the push button J, an armature 64 is secured by suitable screws 65 to the inner end of the sliding frame 44 in position to cooperate with an electromagnetic coil M mounted in a casing 66 disposed on the lower end of the body 40. The coil M is held in position against a partition wall 68 in the casing 66 by a suitable plate 70 fastened thereto by a plurality of screws 71. By reason of the position of the coil M and the armature 64, it will be seen that energization of the coil will attract the armature 64 and thereby move outwardly the sliding frame 44 against the biasing effect of the spring 50. When the sliding frame 44 is thus moved outwardly, it carries with it the push button J by reason of the biasing effect of the spring 56 upon the push button shaft 52. Thus, when the coil M is energized, the push button J is projected beyond the face plate 42 in position ready for operation as shown in Fig. 5. Also, the magnetic force exerted upon the armature 64 is stronger than the force exerted upon the push button by the spring 56. Therefore, when pressure of a finger is applied to the push button, the spring 56 is overcome and the button moves inwardly until it closes the contact members J1 and J2.

For reasons to be explained later, it is desirable to have the armature 64 released very slowly. Therefore, a suitable damping device such as a copper collar 74 is firmly affixed to the inner end of the armature 64. When the coil M is deenergized, the influence of the copper collar 74 will cause the armature 64 to be released slowly as the magnetic effect drops away and the effect of the biasing spring 50 causes the sliding frame 44 to retire to its normal position.

When the push button is pressed inwardly by a waiting passenger as shown in Fig. 6 it is desirable to have some means to hold the push button in its depressed position. For this purpose, we have provided an electromagnetic coil R mounted in the casing 66 in position to attract and hold the enlarged portion 73 of the shaft 52 when the push button is depressed to close a self-holding circuit. This holding coil R will be called the call registering coil.

In order to release the push button after it is depressed and held in by the registering coil R, we have provided a cancelling coil Q which, when energized, counteracts the effects of the registering coil R and permits the push button J to move outwardly in the sliding frame under the pressure exerted by the biasing spring 56.

Inasmuch as each car has its own "up" button and its own "down" button at each floor, we have provided for informing the waiting passenger which button should be pressed to stop the nearest approaching car in the direction which he desires to go, by projecting the floor push button corresponding to said nearest approaching car. Hence, when a passenger desires to go to an upper floor, he will press the only projecting up button. Thereby the passenger will stop the nearest approaching car going up. Likewise, if the passenger desires to go to a lower floor, he will press the only projecting button for the down direction and thereby stop the nearest approaching down car. The buttons at any floor for all the cars except the nearest approaching car are withdrawn out of position for operation by the waiting passenger and are rendered inoperative, and only the projecting buttons at a floor may be effectively operated by waiting passengers to stop the nearest approaching car in the up and in the down directions.

In order that a waiting passenger may be informed or signalled after he presses a projecting floor push button that his stop call has been registered and also which car approaching in the direction he desires to go will stop for him, we have provided a plurality of signals or indicating devices, preferably electric lamps, which are mounted at the hatchway doors at the floor landings and which are commonly known as floor lanterns.

Each of the top and bottom floors is provided with a single signal lamp or floor lantern for each car, but each of the intermediate floors is provided with a pair of lanterns for each car, one serving to indicate that the corresponding car is approaching in the down direction and will make a down stop at the floor, and the other that it is approaching in an up direction and will make an up stop.

The floor lanterns for car A (Fig. 7) are designated 1UL, 2UL, 3UL and 4UL for the up direction at the first, second, third and fourth floors and 5DL, 4DL, 3DL and 2DL for the down direction at the fifth, fourth, third and second floors.

For car B (Fig. 9), the up floor lanterns are designated as B1UL, B2UL, B3UL and B4UL for the first, second, third and fourth floors and the down lanterns as B5DL, B4DL, B3DL and B2DL for the fifth, fourth, third and second floors.

When a passenger presses a projecting floor button, the floor lantern for the nearest approaching car in the direction he desires to go is lighted immediately to indicate to him that that car will stop for him and the hatchway door at which it will stop, so that he may at once walk to that hatchway door and be ready to enter the car as soon as the door opens.

The floor buttons for any car are in a projected condition only at the floors being approached by that car up to the floor corresponding to the car ahead. In other words, each car provides ahead of itself a signal zone defined by its projected push buttons, to indicate to the waiting passengers at the floors in that zone which push buttons should be operated to stop the nearest approaching car.

In order to provide the zones for the cars and project the push buttons therein, we have provided a plurality of zone relays designated as 1UZ, 2UZ, 3UZ and 4UZ for the up direction and 5DZ, 4DZ, 3DZ and 2DZ for the down direction. The zoning relays are common to both cars and divide the complete round trip shaft travel of all the cars into as many signal zones as there are cars operating.

In order to energize the zone relays and feed the zone circuits set up by the zone relays, we have provided a plurality of zone feeding relays, the up zone feeding relays for car A are designated as 1UY, 2UY, 3UY and 4UY for the first, second, third and fourth floors. The down zone feeding relays for car A are designated as 5DY, 4DY, 3DY and 2DY for the fifth, fourth, third and second floors. Car B is provided with similar zone feeding relays having similar designations with the letter B preceding to indicate that they are for car B.

The zone feeding relays are operated in accordance with the position of the cars. Therefore, they not only energize the zone relays and feed the zone circuits but they also assign the zones to the cars. The zone assigned to any one car is the zone in advance of that car's motion. The zone for each car is elastic and keeps moving along with the car, the ends of the zone being determined by the position of the car itself and the position of the next car ahead.

In order that certain circuits may be prepared for operation in the "up" direction when car A is moving upwardly and other circuits be prepared for operation only when car A is moving downwardly, we have provided an up direction preference relay W and a down preference relay X.

At various times in the operation of the elevator system, a car may be so loaded that the operator may desire to run past the outside stop calls for various floors. To permit this operation, a by-pass push-button 75 (Fig. 7) is mounted in car A and a similar by-pass push button B75 is mounted in car B. As long as a car attendant presses the by-pass button in his car, that car will not answer or stop at any floor button call, it will not project its own push buttons in its own zone, and it will prevent registration of stop calls on its floor buttons while by-passing. As soon as the by-pass button is released, the car will again respond to outside calls, project its push buttons, etc.

A by-pass relay N is provided for energization by the pressing of the by-pass button 75 in car A to so modify the control circuits as to effect the various functions described in the by-passing of car A. Similarly, a by-pass relay BN is provided for energization by the pressing of the by-pass button B75 in car B.

When an attendant presses the by-pass button and thereby causes his car to pass a registered floor call without stopping, it is desirable to have such registered floor call transferred immediately to the next following car. In our system this transfer is effected by the operation of the transfer relays, the zone relays and the zone feeding relays. The zone feeding relays for the transferring car are disconnected from operation by the transfer relay of that car. Therefore, the next following car, in operating its zone feeding relays and consequently the zone relays, causes its zone circuit to include the zone circuit of the transferring car, thus effecting the immediate transfer of any registered stop signal which has been by-passed.

In order that the various circuits for the push buttons, floor lanterns, relays, etc., may be connected in accordance with the position of the cars with respect to the floors past which they operate, the car A is provided with a floor selector SE and the car B with a floor selector BSE. The floor selectors may be of any suitable type such as are usually employed in elevator systems and may be located at any suitable point such, for example, as in the pent house or in the elevator shafts.

The floor selector SE for car A is provided with a set of "up" contact segments and a set of "down" contact segments as shown in Fig. 2, which are arranged according to the floors and are disposed to be engaged by cooperating contact brushes 30 to 39, inclusive, mounted upon and insulated from a movable arm SM.

The movable arm SM is operated in accordance with the movements of the car A by means of a screw shaft 77 driven by some part of the operating mechanism of the car. The frictional engagement between the arm SM and its operating screw 77 will cause the arm to bear against the up contact segments when the car is travelling upwardly and against the down contact segments when the car is travelling downwardly, it being understood that the arm will tilt from one position to the other when the direction of operation of the car is reversed. For a more complete detailed description of the type of floor selector here shown, reference may be had to the Smalley and Reiners Patent 634,220 of October 3, 1899.

However, in the present system when the car is at a terminal, it is desirable to have the arm SM tilt to the opposite direction as soon as the car is conditioned to travel in that direction, without waiting until the car actually begins to move. For this purpose, each floor selector is provided with a pair of electromagnets which tilt the floor selector arm to the up direction when the car is at the lower terminal upon closure of the car's up switch, and to tilt the selector arm to the down direction when the car is at the upper terminal upon closure of the car's down switch. The electromagnets on the floor selector SE (Fig. 1) for car A are designated as 13 for the up direction and 14 for the down direction.

The group of up contact segments designated as $a$ under the up brush 30 are energized by the pressing of the car buttons so that the approach of the car to a floor for which a car button has been pressed will cause the energization of the car button stopping relay and thereby effect the stopping of the car at that floor.

The group of up contact segments designated as $b$ under the up brush 31 are energized when stop calls are registered on the floor buttons for the purpose of energizing the floor button stopping relay to stop the car on its up trip when it approaches a floor at which an up stop is to be made in response to a stop signal on the floor buttons.

The group of contact segments designated as $c$ under the brush 32 are energized to light the up floor lanterns for car A at the floors at which that car stops on its up trip.

The group of up contact segments designated as $d$ under the brush 33 serves to so connect the circuits to the zone feeding relays as to energize these relays in accordance with the position of the car.

The group of up contact segments designated as $e$ under the brush 34 completes the circuits for canceling registered stop calls at the floor landings.

The contact segments on the down side of the floor selector are engaged by the brushes 35 to 39, inclusive, when the car is descending and correspond to the contact segments just described for the up direction, those marked $f$ being the down car button stop segments; $g$ the down floor button stop segments; $h$ the down floor call cancelling segments; $i$ the down zone feeding relay segments; $j$ the down floor stop call cancelling segments.

Inasmuch as the length of the contact segments and the sizes of the brushes will vary in accordance with the difference between the floor, speed of cars, etc., in different installations, it is impossible to give the exact dimensions of such segments and brushes in this application. However, with the aid of the illustration given in Fig. 2, any one familiar with the elevator art will be able to arrange the contact segments and brushes on the floor selector to suit any particular installation, after he has ascertained the characteristics of the system.

It should also be noted that, while the floor selector arm SM is being tilted, the circuits for the zone feeding relays should not be opened. Therefore, the brushes 33 and 38 should be so mounted and supported on the arm that one will be engaged before the other is disengaged from its contact segments when the arm tilts.

Furthermore, each of the brushes 33 and 38 is of such length that it spans the opening between adjacent contact segments in moving up or down, in order to prevent momentary deenergization of the zone feeding relays.

Instead of contact segments and push buttons for stopping the cars at the terminal floors, we have, for the sake of simplifying the drawings and description assumed that the cars will be stopped at such terminal floors by the customary limit switches. Inasmuch as such limit switches are old and well known in the elevator art, it has been deemed unnecessary to illustrate and describe the same.

The invention may be understood best by an assumed operation of the system illustrated in the drawings.

It will be assumed that car A is standing at the lower terminal, that car B is standing at the upper terminal and that both cars have their doors open.

The switches 26 and 27 (Fig. 7) are closed to start the motor generator sets of the cars A and B and to prepare the control system for operation.

It will be assumed that the attendant in car A at the lower terminal pressed the up direction push button UP to prepare the car for an up trip. The operation of the button UP opens its contact members UP2 to deenergize the down direction relay X which thereupon closes its contact members X1, thus energizing the up direction preference relay by a circuit extending from the supply conductor L+1 through the contact members DP2 of the push button DP, the coil of relay W, the contact members X1 and the contact members of limit switch ULS to supply conductor L−1.

The energization of the up direction relay W closes its contact members W2 thereby energizing the car button holding coils 2CC, 3CC and 4CC by a circuit extending from the supply conductor L+1 through the coils named and the contact members W2 to the supply conductor L−1 (Fig. 7). If any of the stop buttons in the car are pressed by the car attendant during the "up" trip they will be held in their operated condition by the energized holding coils until the car reaches the upper terminal or the direction of its operation is changed.

When the up direction preference coil W is energized by the closing of the contact members X1 the electromagnet 13, in parallel with the coil W, is energized to tilt the arm SM of the floor selector from its down position to its up position, thereby causing the up brushes to engage the up contact segments for car A.

Inasmuch as car A is standing at the first floor with the high speed relay V deenergized and the brush 32 of the floor selector on the contact segment 1c, the up floor lantern 1UL for car A at the lower terminal is lighted by a circuit extending from the supply conductor L+2 through the contact members V2, brush 32, contact segment 1c and floor lantern 1UL to the supply conductor L−2.

The car is now ready for an up trip and it will be assumed that a waiting passenger enters the car and requests a stop at the third floor. Thereupon, the attendant presses the stop push button 3C for the third floor. Inasmuch as the coil 3CC has been energized as previously described, the button 3C is held in by its holding coil and the stop call for the third floor is thereby registered. The closing of the contact members of the push button 3C completes a circuit for energizing the up stopping segment 3a for the third floor.

It will be assumed that the car attendant now closes the door for the up trip. Inasmuch as the up push button switch UP has already been closed and the closing of the door closes the door contact members 78, the up direction switch U is energized by a circuit extending from the supply conductor L+1 (Fig. 7) through the contact members UP1, the coil U and the contact members D5, F2 and 78 to the supply conductor L—1.

The energization of the switch U closes its contact members U5 to provide a self-holding circuit for itself.

The energization of the switch U closes its contact members U1 and U2, thereby energizing the auxiliary field winding 23 by a circuit extending from the supply conductor L+1 through contact members U1, the field winding 23, the contact members U2, and the resistor 24R to the supply conductor L—1. The closing of the contact members U3 energizes the brake magnet 6, thereby releasing the brake 5. The energization of the field winding and the release of the brake starts the car on its up trip.

The closing of the contact members U3 of the up direction switch also energizes the inductor restoring relay H which closes its contact members H1 to prepare the circuits of the inductor relays F and E for operation when the car is to be stopped.

The energization of the up switch U also closes its contact members U6, thereby energizing the high-speed relay V by a circuit extending from the supply conductor L+1 through the contact members U6 and E1 and the coil V, to the supply conductor L—1. The energization of the high-speed relay V closes its contact members V1, thereby short circuiting the resistor 24R in the circuit of the auxiliary winding 23, thus causing the car to increase to its normal high speed.

The energization of the high-speed relay V opens its contact members V2, thereby opening the circuit to the up floor lantern 1UL for car A and thus extinguishing that lamp.

As car A leaves the lower terminal and approaches the third floor, its contact brush 30 engages the energized car button stop contact segment 3a, thereby energizing the car button stop relay S by a circuit extending from the supply conductor L+1 through the contact members of car button 3C, contact segment 3a, brush 30 and the coil S to the supply conductor L—1. The energization of the relay S closes its contact members S1, thereby energizing the decelerating inductor relay E and the inductor holding relay G, by a circuit extending from supply conductor L+1 in parallel through the coils G and E, and thence through the contact members S1 and H1 to the supply conductor L—1. The energization of the inductor holding relay G closes its contact members G1, thereby holding the inductor circuit until the restoring relay H is operated after the car is stopped.

As car A approaches more closely to the third floor, the decelerating inductor relay E comes opposite the decelerating inductor plate UE, the relay is operated to open its contact members E1, thereby deenergizing the high speed relay V to decelerate the car. The deenergized relay V opens its contact members V1, thereby inserting the resistor 24R in the circuit of the auxiliary winding 23, thus decelerating the car from its normal high speed to its stopping speed. The relay V also closes its contact members V3, thereby energizing the stopping inductor relay F to stop the car when it approaches closer to the floor. The circuit for the relay F extends from the supply conductor L+1 through the coil F, the contact members V3, G1 and H1 to the supply conductor L—1.

Inasmuch as car A is near the third floor, its contact brush 32 is in engagement with the contact segment 3c of its floor selector, thereby completing a circuit for lighting its up floor lantern 3UL at the third floor, by a circuit extending from the supply conductor L+2 through the contact members V2, brush 32, contact segment 3c and the lamp 3UL to the supply conductor L—2. The lighting of the up floor lantern at the third floor will advise any up passenger approaching the elevator that the car corresponding to that light will make an up stop at that floor.

As car A approaches more closely to the third floor, the stopping relay F comes opposite the up stopping inductor plate UF and is operated thereby to open its contact members F1, thus deenergizing the up direction switch U which opens its contact members U1, U2 and U3 to deenergize the generator field winding 23 and the brake magnet 6 thereby applying the brake 5 and stopping the car as it comes level with the third floor.

The opening of the contact members U3 of the switch U also deenergizes the inductor storing relay H to open its contact members H1, thereby deenergizing the inductor relays E and F and the inductor holding relay G to restore them to their normal inactive condition.

The operator now opens the door to permit the passenger to leave the car at the third floor.

Referring now to the zoning system and returning to the position of car A at the lower terminal and car B at the upper terminal, it will be noted that with the cars in these positions, the zone feeding brush 33 of car A is on the zone feeding contact segment 1d, thereby energizing the zone feeding relay 1UY (Fig. 7) by a circuit from the supply conductor L+2 through the coil of relay 1UY, contact segment 1d, brush 33 and the contact members N2 to the supply conductor L+2. The energization of the relay 1UY closes its contact members 1UY1 to feed the zone circuit represented by the ring circuit 80 of car A. The relay 1UY also closes its contact members 1UY2 to energize the zone relay 1UZ by a circuit extending from the supply conductor L+4 (Fig. 8) through contact members 1UY2 and the coil 1UZ to the supply conductor L—4.

The energization of the zone relay 1UZ opens its contact members 1UZ1 in the zone ring circuit 80 of car A (Fig. 7) and opens is contact members 1UZ2 in the zone ring circuit B80 of car B (Fig. 9).

While car B is at the upper terminal, its contact brush B38 is disposed on the down contact segment B5i (Fig. 9) thereby energizing the fifth floor zone feeding relay B5DY for car B by a circuit extending from the supply conductor L+6 through the coil B5DY, contact segment B5i, brush B38, and the contact members BN2 to the supply conductor L—6.

The energization of the relay B5DY closes its contact members B5DY2 for feeding the zone ring circuit B80 (Fig. 9) and closes its contact members B5DY1 (Fig. 8) to energize the zone relay 5DZ by a circuit extending from the supply conductor L+4, through the contact members B5DY1 and the coil 5DZ to the supply conductor L—4.

The energization of the zone relay 5DZ opens its contact members 5DZ1 in the ring circuit 80 of car A and opens its contact members 5DZ2 in the ring circuit B80 of car B (Fig. 9).

It is to be noted now that the contact members 1UZ1 and 5DZ1 are open in the zone ring circuit 80 (Fig. 7) and the contact members 5DZ2 and 1UZ2 are open in the ring circuit B80 (Fig. 9) of car B, thereby dividing the shaft travel of the cars into two signal zones, one for car A and one for car B. The zone for car A extends from the lower floor up to the upper terminal and all of the up buttons for car A at the floors between car A and car B are projected ready for operation by intending passengers. The up buttons for car B at the floors between car B and car A are withdrawn and rendered inoperative by the zone system. In the zone for car B, the down push buttons B4DJ, B3DJ and B2DJ for car B at the fourth, third and second floors and the up button B1UJ for car A at the lower terminal are projected ready for operation by intending passengers, and the down floor buttons 4DJ, 3DJ and 2DJ for car A are held in their inoperative position.

The waiting passenger at the second floor who desires to go up will notice the projecting up button for car A and operate it to stop the next approaching car in the up direction. If a passenger at the second floor desires to go down, he will notice the projecting down push button for car B and will operate that button to stop the next approaching car for the down direction.

It may be noted that all the floor push buttons are normally held in their withdrawn position by the biasing springs 59 and that it is only when their projecting coils M are energized by the zoning system that the correct buttons are projected for operation.

The projection of the floor buttons for car A is effected because the active portion 92 of the zone ring circuit 80 lying between the open contact members 1UZ1 and 5DZ1 and fed by the closed contact members 1UY1 includes the coils 2UM, 3UM, 4UM and 5DM for projecting the up floor buttons 2UJ, 3UJ and 4UJ at the second, third and fourth floors and the down floor button 5DJ at the fifth floor for car A. It will be noticed that the inactive portion 93 of the ring circuit 80 which includes the closed contact members 2DZ1, 3DZ1 and 4DZ1 is not fed by any zone feeding relay, that is, it is not connected by closed contact members to the supply conductor L—1.

By referring to Fig. 3, it will be seen that when the projection coil M of any one of the push buttons is energized, it pulls the armature 64 and thereby causes the sliding frame 44 to carry the push button J out of its recess in the face plate 42 and present it for operation by the waiting passengers, as shown in Fig. 5. Inasmuch as the projection coils M for the down floor push buttons at the fourth, third and second floors and for the up floor push button at the first floor for car A are not energized, the biasing springs 59 thereof cause the push buttons J to be held in their inoperative positions.

Referring now to the zone ring circuit B80 (Fig. 9) for car B, it will be noted that the active portion 91 of the circuit between the open contact members 1UZ2 and 5DZ2 and including the contact members 2DZ2, 3DZ2 and 4DZ2 is fed by the closed contact members B5DY2, and that consequently the projecting coils B4DM, B3DM, B2DM and B1UM are energized to project the down push buttons B4DJ, B3DJ, and B2DJ at the fourth, third and second floors and the up button B1UJ at the first floor for car B.

As car A moves up to the third floor, its contact 33 moves from contact segment 1d to contact segment 2d, thereby changing the length of the zone system for cars A and B as follows: The position of brush 33 on contact segment 2d energizes the zone feeding relay 2UY and deenergizes the zone feeding relay 1UY. The energization of relay 2UY closes its contact members 2UY1 for feeding the ring circuit 80 (Fig. 7), and the closing of contact members 2UY2 energizes the relay 2UZ. Inasmuch as the zone relay 2UZ is energized, it opens its contact members 2UZ1 in zone ring circuit 80 and opens its contact members 2UZ2 in the zone ring circuit B80 (Fig. 9). At the same time the brush 33 having left the contact segment 1d has deenergized the zone feeding relay 1UY, thereby opening its contact members 1UY1 for feeding the active portion 92 of the zone ring circuit 80, and has opened its contact members 1UY2, thereby deenergizing the zone relay 1UZ, which in turn closes its contact members 1UZ1 in the ring circuit 80 and its contact members 1UZ2 in the ring circuit B80. An examination of the ring circuits now discloses that the energized portion 92 of the ring circuit 80 extends from the open contact members 2UZ1 through the closed contact members 3UZ1 and 4UZ1 to the open contact members 5DZ1 and that this portion of the ring zone circuit is fed by the closed contact members 2UY1; therefore, the button projecting coils 3UM, 4UM and 5DM are energized to project the up buttons 3UJ and 4UJ at the third and fourth floors and the down button 5DJ at the fifth floor for car A.

Referring now to the ring circuit B80 for car B, we find that the open contact members 2UZ2 and 5DZ2 cause the active portion 91 of the circuit to extend from the contact members 2UZ2 through the contact members 1UZ2, 2DZ2, 3DZ2 and 4DZ2 to the open contact members 5DZ2 and that this portion 91 of the ring circuit B80 is fed by the closed contact members B5DY2. Therefore, the projecting coils B4DM, B3DM, B2DM, B1UM and B2UM are energized to project the down floor buttons B4DJ, B3DJ and B2DJ for car B at the fourth, third and second floors and the up floor buttons B1UJ and B2UJ for car B at the first and second floors.

As car A moves from the second floor to the third floor, the contact brush 33 moves from the contact segment 2d to the contact segment 3d, thereby deenergizing the zone feeding relay 2UY and energizing the zone feeding relay 3UY. Consequently, the active portion 92 of the ring circuit 80 is fed by the closed contact members 3UY1 instead of 2UY1, and the contact members 3UZ1 are opened and the contact members 2UZ1 are closed.

The active portion 92 of the ring circuit 80 now extends from the open contact members 3UZ1 through the closed contact members 4UZ1 to the open contact members 5DZ1. This active portion of the circuit 80 is fed by the closed contact members 3UY1; therefore, the projecting coil 4UM is energized to project the up floor button 4UJ for car A at the fourth floor.

The energization of the zone relay 3UZ and the deenergization of the zone relay 2UZ also changes the active portion 91 of the ring circuit B80 (Fig. 9), because the contact members 3UZ2 are opened and the contact members 2UZ2 are closed in that circuit. The active portion 91 of the circuit B80 now extends from the open contact members 3UZ2 through closed contact members 2UZ2, 1UZ2, 2DZ2, 3DZ2, and 4DZ2 to the open contact members 5DZ2. Inasmuch as this active portion of the circuit is still fed by the closed contact members 5DY2, the up buttons B1UJ, B2UJ and B3UJ at the first, second and third floors and the down buttons B4DJ, B3DJ and B2DJ at the fourth, third and second floors for car B are projected by the energization of the projecting coils B3UM, B2UM, B1UM, B2DM, B3DM and B4DM.

It may be noted here that although car A is standing at the third floor on an up trip, ready to move upwardly, the up floor button B3UJ for car B at that floor is projected. However, it should be noted that inasmuch as car A is standing at the third floor, the high speed relay for car A is deenergized thus closing its contact members V4 (Fig. 8) and thereby preparing a circuit which will be completed through the deenergizing coil B3UQ, if the button B3UJ is pressed. If this projecting button is pressed, it will simply complete a cancellation circuit extending from the supply conductor L+3 through the contact segment 3e, brush 34, and the contact members V4 to the supply conductor L—3. Therefore, any effort to register a stop call on this button will be ineffectual because it would energize a cancellation coil at the same time it energized a registering coil.

From the foregoing description, it will be seen that the zone of projecting push buttons for each car travels with that car and extends in front of that car up to the next car ahead. It will also be seen that the zones travel along with the cars and that a zone may extend away from a terminal as well as toward a terminal when neither of the cars defining the zone is at the terminal. In other words, the zone system extends "around the corner" when no car is at the terminal and is not limited only to the direction in which the car is physically moving.

It will be assumed now that a waiting passenger, standing at the second floor landing, desires to make a down trip. As previously described, the down push button 2DJ at the second floor for car A is normally withdrawn and the zone system has operated to project the down push button B2DJ for car B at that floor. Therefore, the waiting passenger will observe the projecting push button B2DJ and, being desirous of going down, will operate that push button to stop the nearest approaching down car.

The closing of the push button B2DJ completes a circuit for energizing the stop call registering coil B2DR by a circuit extending from the supply conductor L+3 through the contact members of button B2DJ, the coil B2DR and conductors 81 and 82 to the supply conductor L—3. As shown in Fig. 6, the energization of the registering coil R holds the operated push button in its pressed position. In this position, its contact members J1 are closed, thus completing a self-holding circuit.

The operation of the push button B2DJ also closes its contact members B2DJ1 (Fig. 9), thereby lighting immediately the down floor lantern B2DL for car B at the second floor, by a circuit extending from the supply conductor L+6 through the contact members B2DJ2 and the lamp B2DL to the supply conductor L—6. Thus, it is seen that, as soon as the waiting passenger presses a push button to stop the nearest approaching car, he at once receives a signal by way of the lighting of a floor lantern telling him that a car will stop for him and at which door it will stop so that he may immediately step to that door and be ready to enter the car as soon as the door opens.

The closing of the contact members B2DJ2 also energizes the contact segment B2g so that, when car B comes within a predetermined distance of the second floor, the contact brush B36 will strike this energized segment and, through a sequence of relays, be operated to stop car B at the second floor.

As previously described, car B is standing at the upper terminal ready to make a down trip. Therefore, its down direction preference relay BX is energized by a circuit extending from supply conductor L+5 (Fig. 9) through the contact members BUP2 of up direction button BUP, the coil BX and the contact members BW1 and BDLS to the supply conductor L—5. The energization of the relay BX closes its contact members BX2 thereby energizing the car button holding coils B2CC, B3CC and B4CC so that if the car attendant presses any car button on the down trip, that button will be held in its pressed position by its corresponding holding coil until the car reaches the lower terminal.

The energization of the down direction switch BX also causes the energization of the electromagnet B14 in parallel therewith to tilt the floor selector arm BSM to its down direction position. In this position, the floor lantern brush B37 is disposed on the floor lantern segment B5h and, inasmuch as the high speed relay BV for car B is not yet energized, its contact members BV3 are closed and cause the lighting of the down floor lantern B5DL for car B at the upper terminal, by a circuit extending from the supply conductor L+6 through the contact members BV3, brush B37, contact segment B5h and the floor lantern B5DL to the supply conductor L—6.

It will be assumed that the attendant in car B at the upper terminal now proceeds to move the car downwardly by closing the door and pressing the down starting push button BDP in the car. The closing of the door (not shown) closes the door contact members B78.

The closing of the start button contact members BDP1 energizes the down direction switch BV by a circuit extending from the supply conductor L+5, through the contact members BDP1, the coil BD, the contact members BU4, BF1 and B78 to the supply conductor L—5.

The energization of the switch BD closes its contact members BD4 to provide a self-holding circuit for itself.

The energization of the switch BD also closes its contact members BD1, BD2 and BD3 to complete circuits for energizing the auxiliary generator field winding B23 and the brake magnet B6. The circuit for the auxiliary field winding extends from the supply conductor L+5 through the contact members BD2, the winding B23, the contact members BD1 and the resistor B24R to the supply conductor L—5. The circuit for the brake magnet B6 extends from the supply conductor L+5 through the contact members BD3 and the coil B6 to the supply conductor L—5.

The energization of the field winding B23 and the release of the brake 5 by the energized brake magnet B6 causes the car to start downwardly.

The closing of the contact members BD6 of the energized switch BD energizes the high speed relay BV to close its contact members BV2, thereby short-circuiting the resistor B24R and thus causing the car to operate at its normal high speed.

The energization of the high speed relay BV causes it to open its contact members BV2 thereby extinguishing the down floor lantern 5DL for car B at the upper terminal.

The closing of the contact members BD3 of the relay BD also energizes the relay BH to close its contact members BH1 for restoring the inductor relays of car B so that they may be again energized to stop the car when desired.

It will be assumed that as car B moves downwardly in its shaft, the attendant, desirous of running the car to the first floor without taking on additional passengers, presses the by-pass or transfer push button B75 in car B and maintains it in a pressed condition until his car arrives at the lower terminal. The operation of the push button B75 energizes the by-pass relay by a circuit extending from the supply conductor L+5 through the contact members of button B75 and the coil BN to the supply conductor L—5. This operation at once transfers the registered down stop call at the second floor from car B to car A by extinguishing the signal lantern of car B at the second floor, by immediately lighting the down signal lantern of car A at the second floor, by so changing the system that the heretofore projecting push buttons for car B are withdrawn and only the push buttons of car A are projected at the various floors for operation by the waiting passengers, by deenergizing the down stopping segment B2g of car B so that it will not stop car B at the second floor and by energizing the down stopping contact segment 2g for car A so that it will stop car A at the second floor.

The energization of the by-passing relay BN opens its contact members BN1 in the circuit connecting the floor button stopping relay BT to the supply conductor L—6 (Fig. 9), and thereby renders the relay BT inoperative and thus prevents the stopping of car B at the second floor in response to a registered call on its floor push button at the second floor. This does not affect the stop push buttons in the car, and if the car attendant desires to press the car stop push button for the second floor or any other floor, car B will stop in response thereto.

The energization of the transfer relay BN also opens its contact members BN2 in the circuit connecting the brushes B38 and B33 to the supply conductor L—6, thereby deenergizing the zone feeding relays for car B and rendering them incapable of energization until the by-pass button B75 is released by the car attendant. Inasmuch as the zone feeding relays 2DY, etc., for car B are deenergized, none of the zone relays 1UZ, etc., (Fig. 8) are energized thereby. Therefore, the only zone relays energized during the by-passing operation of car B are the zone relays energized by the operation of the zone feeding relays of car A.

As previously described, with car A standing at the third floor on an up trip, its brush 33 is on the contact segment 3d, thus energizing the zone feeding relay 3UY.

The energization of the zone feeding relay 3UY closes its contact members 3UY1, thus energizing the zone feeding relay 3UZ to open its contact members 3UZ1 in the ring circuit 89 (Fig. 7) and its contact members 2UZ2 in the ring circuit B80 (Fig. 9), as previously described. Also, the closing of the contact members 3UY1 of the zone feeding relay 3UY provides a feeding connection for the zone ring circuit 80 to the supply conductor L—1.

Inasmuch as only the contact members 3UZ1 in the zone ring circuit 80 are open and the closed contact members 3UY1 provide a feed circuit for that ring circuit, all of the up projecting coils 1UM, etc., and all the down projecting coils 5DM, etc., for car A are energized to project the floor push buttons for car A. Hence, the zone of projected buttons for car A not only extends up but also down its shaft.

Referring again to car B, during its by-passing stage it does not energize any zone feeding relays nor zone relays. Therefore, the only open contact members in the zone ring circuit B80 for car B are the contact members 3UZ2 of the zone relay operated by car A, but no zone feeding relay contact members are closed in connection with this circuit to provide a feed therefor. Therefore, none of the floor projecting coils B1UM, etc., are energized for car B and no floor buttons are projected for car B.

By referring to Fig. 8, it will be noted that when the down stop call at the second floor was registered on push button B2DJ, the operation of that button not only completed a call registering circuit through the registering coil B2DR of the push button for car B but also completed a circuit through the registering coil 2DR for the push button 2DJ of car A.

However, even though the closing of the floor button B2DJ energized the registering coil 2DR of the floor button 2DJ for car A at the second floor and thereby effected a magnetic pull upon the armature portion 73 of the button 2DJ, as will be seen by Fig. 3, it will be noted that this condition does not yet effect a closure of its contact members 2DJ1 and 2DJ2 because the sliding frame 44 is still in its rearmost position and is held there by the biasing effect of the spring 50. It will be seen that as long as the spring 50 holds the sliding frame in its rearmost position, which occurs as long as the projecting coil M is not magnetized, the push button contact members cannot be closed.

Inasmuch as the by-passing action of car B stopped the operation of its zone feeding relays and the energization of the zone relays controlled thereby thus eliminating all zone action for car B and deenergized its floor button projecting coils B1UM etc., the floor button projecting coil B2UM for car B at the second floor is deenergized and permits the sliding frame 44 (see Fig. 3) of that push button to resume its normal position by reason of the reaction of its biasing spring 50. This action of the sliding frame 44 opens the contact members B2DJ1 and B2DJ2 of the down button B2DJ at the second floor for car B, thereby extinguishing the down floor lantern B2DL at the second floor for car B, deenergizing the floor button stopping contact segment B2g for car B, and deenergizing the floor call registering coil B2DR.

The by-passing action of car B in eliminating the zoning system for car B and making the zone for car B extend both up and down the shaft, also causes the energization of the floor button projecting coil 2DM for the down floor button 2DJ for car A at the second floor. The circuit for energizing the coil 2DM extends from the supply conductor L+1 (Fig. 7) through the coil 2DM to the one side of the ring circuit 80 and thence through the closed contact members 2DZ1, 1UZ1, 2UZ1 and 3UZ1, conductor 85 and contact members 3UY1 to the supply conductor L—1. The energization of the coil 2DM causes the sliding frame 44 for the floor button 2DM to move outwardly against the biasing effect of its spring 50. Inasmuch as the push button 2DJ is held in its innermost position by the energized condition of its call registering coil 2DR, the outward movement of its sliding frame 44 causes its contact members 2DJ1 and 2DJ2 to close.

The closing of the contact members 2DJ1 immediately lights the down floor lantern 2DL for car A at the second floor, thereby informing the waiting passenger at that floor that his call has been transferred to another car and also indicating the door at which the other car will stop so that the passenger may move to that door and be ready to board the car when it arrives and opens the door. The closing of the contact members 2DJ1 also energizes the floor button stopping contact segment 2g to cause car A to stop when it comes down to the second floor.

The closing of the contact members 2DJ2 completes a self-holding circuit for maintaining the floor call registering coil 2DR in an energized condition until the stop call is answered by car A.

In order that the down stop call at the second floor may be transferred from car B to car A by the transfer button B75, it is necessary to cause a delay in opening the contact members B2DJ1 and B2DJ2 of the floor button B2DJ until the contact members 2DJ1 and 2DJ2 of floor button 2DJ are closed, it being known that the deenergization of the floor button projecting coil B2DM and the energization of the floor button projecting coil 2DM occur simultaneously. Therefore, in order to effect the transfer, it is necessary to maintain the push button contact members B2DJ1 and B2DJ2 in a closed condition until after the push button contact members 2DJ1 and 2DJ2 are closed.

The delay in opening the contact members B2DJ1 and B2DJ2 is effected by placing a suitable damping means such as a copper band 74 upon the armature 64 (Fig. 3) of the button B2DJ. When the projecting coil M is energized, the armature 64 is pulled in promptly and the band 74 has no effect upon its action. However, when the projecting coil is deenergized, the band 74 delays the inner movement of the sliding frame 64 for a period of time sufficient to permit the armature of the push button 2DJ to move its sliding frame outwardly and close the contact members 2DJ1 and 2DJ2, before the contact members B2DJ1 and B2DJ2 open.

This period of time delay is very short—just long enough to permit the operation of one projecting coil before the other is deenergized. Thus the action may be said to take place immediately.

It will be assumed now that the attendant in car B keeps that car moving until it reaches the lower terminal where it is stopped by the usual limit switches. The limit switch BDLS is also operated by the approach of car B to its lower terminal to deenergize the down direction preference relay BX, which in turn, closes its contact members BX1, thereby energizing the up direction preference relay BW and also the electromagnet B13. The deenergization of the relay BX and the energization of the relay BW first opens the contact members BX2 and then closes the contact members BW2 in the circuit of the car button holding coils for car B (Fig. 9) thereby deenergizing and again energizing the holding coils B2CC, B3CC and B4CC for the up trip. The energization of the electromagnet B13 tilts the floor selector arm BSM to engage the up brushes with the up contact segments for car B.

It will also be assumed that the attendant in car B releases the by-pass button B75 when the car reaches the lower terminal and thereby deenergizes the by-pass relay BN which closes its contact members BN1 and BN2 to restore the zoning system and the floor button stopping system for car B.

With car B at the lower terminal ready for an up trip, its zone feed brush B33 is disposed on the contact segment B1d, thereby energizing its zone feed relay B1UY. The energization of the relay B1UY closes its contact members B1UY2 to feed the ring zone circuit B80 and closes its contact members B1UY1 to energize the zone relay 1UZ (Fig. 3) which in turn opens its contact members 1UZ1 in the ring circuit 80 and its contact members 1UZ2 in the ring circuit B80.

Inasmuch as car A is still standing at the third floor on its up trip, its zone feed brush 33 is disposed on the contact segment 3d thereby energizing its zone feed relay 3UY (Fig. 7). The energization of relay 3UY closes its contact members 3UY1 to feed the zone ring circuit 80 and closes its contact members 3UY2 to energize the zone relay 3UZ, which in turn opens its contact members 3UZ1 in the ring circuit 80 and its contact members 3UZ2 in the ring circuit B80.

Referring to the ring circuit 80 its active portion extends from the open contact members 3UZ1 through the contact members 4UZ1, 5DZ1, 4DZ1, 3DZ1 and 2DZ1 to the open contact members 1UZ1 and is fed by the closed contact members 3UY1 in conductor 85. Consequently, the floor button projecting coils 4UM, 5DM, 4DM, 3DM, 2DM and 1UM are energized and project the floor push buttons 4UJ, 5DJ, 4DJ, 3DJ, 2DJ and 1DJ for car A, thus indicating that the zone of car A includes its up button at the fourth floor, its down buttons at the fifth, fourth, third and second floors and its up button at the first floor.

Inasmuch as the projecting coils 2UM and 3UM for car A are connected to the dead portion of the ring circuit 80, they are not energized to project the up floor buttons 2UJ and 3UJ for car A.

Referring to the zone ring circut B80 for car B (Fig. 9), its active portion extends from the open-contact members 1UZ2 through the contact members 2UZ2 to the open contact members 3UZ2 and is fed by the closed contact members B2DY2 in the conductor 86. This active portion of the ring circuit B80 has connected to it the floor button projecting coils B2UM and B3UM which are energized thereby to project the up floor buttons B2UJ and B3UJ at the second and third floors for car B.

Inasmuch as the projecting coils B4UM, B5DM, B4DM, B3DM, B2DM and B1UM for car B are connected to the dead portion of the ring circuit B80, they are not energized to project the up floor buttons B1UJ and B4UJ and the down floor buttons B5DJ, B4DJ, B3DJ and B2DJ for car B. Thus, it is seen that one zone is provided for car A and the other zone for car B, indicating at the various floors which push button should be operated by the waiting passengers to stop the next approaching car for their direction.

While car B stands at the lower terminal ready for an "up" trip, its floor lantern D1UL is lighted by a circuit (Fig. 9) extending from the supply conductor L+6 through the contact members BV3, brush B32, contact segment B1c and the floor lantern B1UL to the supply conductor L—6.

It will be assumed that the attendant on car A now standing at the third floor closes the elevator door and presses the button UP to cause the car to travel upwardly to the upper terminal. The operation of the starting button UP energizes the up direction switch U, which in turn effects the energization of the auxiliary generator field winding 23, the brake magnet 6, the inductor restoring relay H and the high speed relay V to start the car upwardly in the same manner as described in starting it from the first floor.

It will be assumed also that car A runs to the upper terminal and is stopped by the usual limit switch etc. (not shown).

As car A stops at the upper terminal, the up limit switch ULS (Fig. 7) is operated to open position thereby deenergizing up direction preference relay W, which in turn closes its contact members W1 to thereby energize the down direction relay X in preparation for the down trip. The circuit for the down relay X extends from the supply conductor L+1 through the contact members UP2, the coil X, the contact members W1 and the limit switch DLS to the supply conductor L—1.

The opening of the contact members W2 on the deenergized down relay W opens the circuit for the holding coil 2CC, 3CC and 4CC and thereby causes them to release the car button 3C which has been pressed by the car attendant to effect the stopping of the car at the third floor on its up trip. The closing of the contact members X2 in the circuit of the car button holding coils again energizes these coils to hold or register any stop calls on the car stop buttons during the down trip.

The energization of the down direction preference relay X also causes the energization of the electromagnet 14 (which is in parallel with the coil X) to tilt over the floor selector arm SM until its down contact brushes are in position to engage its down contact segments.

When car A comes to and stops at the upper terminal, its floor lantern 5DL at that floor is lighted (Fig. 7) because its floor lantern brush 37 is in engagement with the contact segment 5h and its high speed relay contact members V2 are closed. This circuit extends from the supply conductor L+2, through the contact members V2, brush 37, contact segment 5h, and the lantern 5DL to the supply conductor L—2.

As car A moved to and stopped at the upper terminal, the zone feeding relay brush 33 moved upwardly along the up zone feed relay contact segments 3d and 4d, and, by the action of the electromagnet 14, the floor selector was then tilted to cause the zone feed relay brush 38 to engage the down zone feed relay contact segment 5i. In this position the brush 38 and the contact segment 5i cooperate to energize the zone feed relay to close its contact members 5DY1 to feed the zone ring circuit 80 (Fig. 7) and also to close its contact members 5DY2 to energize the zone relay 5DZ (Fig. 8).

The energization of the zone relay 5DZ opens contact members 5DZ1 in the ring circuit 80 and 5DZ2 in the ring circuit B80. The active portion in the circuit 80 is now fed by the closed contact members 5D1 and extends from the open contact members 5DZ1 through the closed contact members 4DZ1, 3DZ1 and 2DZ1 to the open contact members 1UZ1. The projecting coils 1UM, 2DM, 3DM and 4DM are thus energized to project the corresponding push buttons 1UJ, 3DJ and 4DJ for car A, thus defining the zone for the floor buttons of car A as extending from the upper terminal to the lower terminal.

It is to be noted that, inasmuch as the floor button registering coil 2DR on the down button 2DJ at the second floor for car A was energized by a self-holding circuit at the time the call was transferred, that button is held in its depressed position as shown in Fig. 6 and does not project and also causes the down floor lantern 2DL at the second floor for car A to remain lighted to indicate that the car will make the next down stop. Therefore, the waiting passenger at the second floor does not need any projecting button and is informed which car will carry him downwardly.

Inasmuch as car B still remains at the lower terminal, the active portion of the ring circuit B80 fed by the closed contact members B1UY2 extends from open contact members 1UZ2 through the closed contact members 2UZ2, 3UZ2, 4UZ2 and up to the open contact members 5DZ2. The floor button projecting coils B2UM, B3UM, B4UM and B5DM are connected to this active portion of the ring circuit B80 and therefore the up floor button calls B2UJ, B3UJ, and B4UJ and the down floor button B4DJ for car B, are projected at the second, third, fourth and fifth floors to indicate that they should be pressed to stop the next approaching car on an up trip.

It will be assumed now that the attendant on car A starts that car on its down trip by closing the door and by pressing the down starting button DP to energize the down direction switch by a circuit extending from the supply conductor L+1 (Fig. 7) through the contact members DP1 of the starting button DP, the coil D and the contact members 44, F1 and 73 to the supply conductor L—1.

The energization of the down direction switch D closes its contact member D4 to establish a self-holding circuit for itself, closes its contact members D1 and D2 to energize the auxiliary field winding 23 and closes its contact members D3 to energize the brake magnet 6. The energization of the auxiliary field winding 23 and the brake magnet 6 starts the hoisting motor 12 and releases the brake 5, thereby moving the car A downwardly.

The closing of the contact members D3 of the switch D also energizes the inductor restoring relay H to close its contact members H1, thereby preparing the inductor relays for operation when it is necessary to again stop car A.

The closing of the contact members D6 of the switch D energizes the high speed relay V to close its contact members V1, thereby short circuiting the resistor 24R in the auxiliary field winding 23 and thus operating the car downwardly at its normal high speed.

As car A leaves the fifth floor, the energization of the high speed relay V opens its contact members V2 in the circuit leading to the brush 37 and thereby extinguishes the down lamp 5DL for car A at the fifth floor.

As car A continues downwardly to within a predetermined distance of the second floor, the floor button stopping brush 36 engages the contact segment 2g energized as the result of the registered down stop call at the second floor and thereby causes the energization of the floor button stopping relay T for car A.

The energization of the relay T closes its contact members T1, thereby energizing the decelerating inductor relay E and the inductor holding relay G by a circuit extending from line conductor L+1 (Fig. 7) through the coils G and E in parallel thence through the contact members T1 and H1 to the supply conductor L—2.

The energized relay G closes its contact members G1 thus providing a holding circuit for the inductor relays.

As the car approaches still closer to the second floor, the energized decelerating relay E comes opposite the down high speed inductor plate DE (Fig. 1) and is thereby operated to open its contact members E2 which deenergizes the high speed relay V (Fig. 7), causing that relay, in turn, to open its contact members V1, thus reinserting the resistor 24R in the auxiliary field winding circuit 23 and thereby decelerating the car to its stopping speed.

The energization of the high speed relay V also closes its contact members V3, thereby energizing the stopping inductor relay F, the closing of the contact members V2 of the relay V also connects the down brush 37 to the supply conductor L+2 so that the down floor lantern 2DL for car A at the second floor will be maintained in a lighted condition while car A makes its stop at the second floor.

As the car comes within a short distance of the second floor the stopping inductor relay F comes opposite the down stopping inductor plate DF and is thereby operated to open its down contact members F2, thus deenergizing the down direction switch D which opens its contact members D1 and D2 and D3 to deenergize the auxiliary field winding 23 and the brake magnet 6. The deenergization of the field winding 23 and the brake magnet 6 stops the hoisting motor 18 and applies the brake 5 so that the car stops level with the second floor.

As the car A moved into and stopped at the second floor, its stop call cancelling brush 39 engaged the contact segment 2j, thereby energizing the cancelling coil 2DQ by a circuit extending from the supply conductor L+3 (Fig. 8) through the contact members of button 2DJ, the coil 2DQ, the contact segment 2j, brush 39, and contact members V4, to the supply conductor L—3. The energized cancellation coil 2DQ counteracts the magnetic effect of the energized registering relay 2DR, thereby releasing the push button 2DJ to its normal position in its sliding frame 44.

With car A standing at the second floor, its zone feeding contact brush 38 is disposed on the contact segment 2i thereby energizing the zone feeding relay 2DY which closes its contact members 2DY1 to feed the active portion of the ring circuit 80 of car A (Fig. 7) and closes its contact members 2DY2 (Fig. 8) to energize the zone relay 2DZ, which in turn opens its contact members 2DZ1 in the ring circuit 80 (Fig. 7) of car A and its contact members 2DZ2 in the ring circuit B80 (Fig. 9) of car B. The active portion 93 of the ring circuit 80 for car A (Fig. 7) is fed by the closed contact members 2DY1 and extends from the open contact members 2DZ1 to the open contact members 1UZ1. This active portion includes the floor button projecting coil 1UM, which is thereby energized to project the floor button 1UJ for car A at the lower terminal. Thus inasmuch as car A is standing on a down trip at the second floor and car B is standing at the first floor, there is practically no zone for car A.

On the other hand, the ring circuit B80 for car B (Fig. 9) has an active portion extending from the open contact members 1UZ2 through the conductor 90 to the open contact members 2DZ2 which is fed by the closed contact members B1UY2. This active portion of the ring circuit B80 includes the up projecting coils B2UM, B3UM and B4UM and the down projecting coils B5DM, B4DM, B3DM and B2DM. Hence the signal zone for car B extends upwardly to the upper terminal and thence down to the second floor where car A is standing. This means that the up buttons B2UJ, B3UJ, B4UJ and the down buttons B5DJ, B4DJ and B2DJ are in a projected condition to call the attention of waiting passengers that they should be pressed when it is desired to stop the nearest approaching car for the direction of the corresponding button.

In view of the foregoing description, it will be seen that we have provided a novel signal and control system by means of which the waiting passengers at the various floors are advised which buttons to operate to stop the nearest approaching cars and also that a call, after being made and registered, may be instantly transferred from the nearest approaching car to the next following car by the attendant on the nearest car and that the waiting passenger will also be informed immediately as to the transfer of his registered call.

Although we have illustrated and described only one specific embodiment of our invention, we desire it to be understood that many modifications and changes may be made therein without departing from the spirit and scope of our invention.

We claim as our invention:

1. In an elevator system for operating a plurality of cars past a floor, a plurality of control devices at the floor, one for each car, and means responsive to the position of the cars for moving one of the control devices into position for operation by waiting passengers.

2. In an elevator system for operating a plurality of cars past a floor, a plurality of control devices at the floor, one for each car, means for biasing the control devices to inoperative position and means responsive to the position of the cars for moving one of the control devices into an operative position.

3. In an elevator system for operating a plurality of cars past a plurality of floors, a plurality of control devices, one for each direction for each car at each floor, and means responsive to the position of the cars for moving into operative position the control devices at each floor corresponding to the nearest approaching car in each direction.

4. In an elevator system for operating a plurality of cars serving upper and lower terminal floors and intermediate floors, an up control device at the lower terminal floor and at each of the intermediate floors for each car, a down control device at the upper terminal floor and at each of the intermediate floors for each car, and means responsive to the position of the cars for presenting for operation only the control devices corresponding to the next car for down service at each of the intermediate floors and the upper terminal floor and to the next car for up service at each of the intermediate floors and the lower terminal floor regardless of the position or direction of operation of the cars.

5. In an elevator system for operating a plurality of cars serving an upper and a lower terminal floor and intermediate floors, an up control device at the lower terminal floor and at each of the intermediate floors for each car, a down control device at the upper terminal floor and at each of the intermediate floors for each car, and means for moving into inoperative position all of the control devices at each floor except the control devices corresponding to the next car for down service at each of the intermediate floors and the upper terminal floor and to the next car for up service at each of the intermediate floors and the lower terminal floor.

6. In an elevator system for operating a plurality of cars serving upper and lower terminal floors and intermediate floors, an up control device at the lower terminal floor and at each of the intermediate floors for each car, a down control device at the upper terminal floor and at each of the intermediate floors for each car, and means responsive to the position of the cars for moving from inoperative position to operative position the control devices corresponding to the next car for down service at each of the intermediate floors and the upper terminal floor and to the next car for up service at each of the intermediate floors and the lower terminal floor regardless of the position or direction of operation of the cars.

7. In an elevator system for operating a plurality of cars past a floor, a plurality of control devices at the floor, one for each car, means responsive to the position of the cars for projecting one of the control devices, and means responsive to the operation of a control device for stopping a car at the floor.

8. In an elevator system for operating a plurality of cars past a floor, a plurality of control devices at the floor, one for each car, means responsive to the position of the cars projecting the control device for the nearest approaching car to a position for operation by waiting passengers, and means responsive to operation of the projected control device for stopping said car at the floor.

9. In an elevator system for operating a plurality of cars past a floor, a plurality of control devices at the floor, one for each car, means responsive to the position of the cars for moving the control device for the nearest approaching car from an inoperative position to an operative position, and means responsive to operation of said control device for stopping the car corresponding thereto.

10. In an elevator system for operating a plurality of cars past a plurality of floors, a plurality of control devices at each floor, one for each car in the up direction and one for each car in the down direction, a projecting coil associated with each control device, and means responsive to operation of the cars for energizing the projecting coil of the control device at each floor which should be operated for stopping the nearest approaching car in the desired direction.

11. In an elevator system for operating a plurality of cars past a plurality of floors, a plurality of control devices at each floor, one for each car in the up direction and one for each car in the down direction, a projecting coil associated with each control device, means responsive to the position of the cars for energizing the projecting coil of the control device at each floor which should be operated for stopping the nearest approaching car in the desired direction, and means responsive to operation of the projecting control devices for stopping corresponding cars at corresponding floors in the direction desired regardless of the order of operation of the projecting control devices.

12. In an elevator system for operating a plurality of cars past a plurality of floors, a plurality of control devices at each floor, one for each car in the up direction and one for each car in the down direction, a projecting coil associated with each control device, a registering coil associated with each control device, means responsive to the position of the cars for energizing the projecting coil of the control device at each floor which should be operated for stopping the nearest approaching car for that floor in the corresponding direction, and means responsive to operation of a control device for energizing the registering coil to maintain the control device in an operated condition.

13. In an elevator system for operating a plurality of cars past a plurality of floors, a plurality of control devices at each floor, one for each car in the up direction and one for each car in the down direction, a projecting coil associated with each control device, a registering coil associated with each control device, means responsive to the position of the cars for energizing the projecting coil of the control device at each floor which should be operated for stopping the nearest approaching car for that floor in the corresponding direction, means responsive to operation of a control device for energizing the registering coil to maintain the control device in an operated condition, and means responsive to the registration of a stop signal on a push button for stopping the corresponding car at the corresponding floor in the desired direction, regardless of the order of the registration of stop signals.

14. In an elevator system for operating a plurality of cars past a plurality of floors, a plurality of control devices at each floor, one for each car in the up direction and one for each car in the down direction, a projecting coil associated with each control device, a registering coil associated with each control device, a cancellation coil associated with each control device, means responsive to the position of the cars for energizing the projecting coil of the control device at each floor which should be operated for stopping the nearest approaching car in the desired direction, means responsive to passenger operation of a projected control device for energizing the registering coil associated therewith to register a stop signal on the control device, means responsive to the registration of a stop signal on the control device for stopping the corresponding car at the corresponding floor, and means responsive to the operation of the cars for energizing the cancellation coils associated with the control devices on which stop signals have been registered for cancelling said registered stop signals when they are answered.

15. In a control device, a body member, a frame slidably mounted in the body member, means biasing the frame to an inner position, a push button slidably mounted in the frame, means for limiting the movement of the push button relative to the frame and biasing it to an out position in the frame, and means for moving the frame outwardly against its biasing means to carry the push button to an outer position.

16. In a control device, a body member, a frame slidably mounted in the body member, means biasing the frame to an inner position, a push button slidably mounted in the frame, means for limiting the movement of the push button relative to the frame and biasing it to an out position in the frame, and an electromagnet for moving the frame outwardly against its biasing means to carry the push button to an outer position.

17. In a control device, a body member, a frame movably mounted in the body member, means biasing the frame to an inner position in the body member, a push button movably mounted in the frame, means for limiting the movement of the push button relative to the frame and biasing it to an outer position in the frame, means for moving the frame outwardly against its biasing means to carry the push button to an outer position, and a pair of cooperating contact members mounted on the button and the frame in position to engage each other when the frame is in its outer position and the button is moved to its inner position.

18. In a control device, a body member, a frame slidably mounted in the body member, means biasing the frame to an inner position in the body member, a push button slidably mounted in the frame, means for limiting the movement of the push button relative to the frame and biasing it to an outer position in the frame, means for moving the frame outwardly against its biasing means to carry the push button to an outer position, and a pair of cooperating contact members mounted on the button and the frame in position to engage each other when the frame is in its outer position and the button is pressed, and means associated with the body member for limiting the inner travel of the button relative to the body member.

19. In a control device, a body member, a frame slidably mounted in the body member, means biasing the frame to an inner position in the body member, a push button slidably mounted in the frame, means for limiting the movement of the push button relative to the frame and biasing it to an outer position in the frame, means for moving the frame outwardly against its biasing means to carry the push button to an outer position, a pair of cooperating contact members mounted on the button and the frame in position to engage each other when the frame is in its outer position and the button is pressed, means for limiting the inner travel of the button relative to the body member, and an electromagnet responsive to the closing of said contact members for maintaining the push button in its inner position after it is pressed with the frame in its outer position at the time of the pressing operation.

20. In an elevator system for operating a plurality of cars past a floor, a car stopping means for each car, individual means for registering calls to operate the stopping means to stop the car at the floor, a plurality of signal devices at the floor, one for each car, manually-operated means for transferring a registered stop call from one car to the next following car, and means responsive to operation of the transfer means for immediately operating the signal device of said next following car to indicate to the waiting passenger that said following car will stop for him and for immediately rendering inoperative the signal device of the car from which the registered call has been transferred.

21. In an elevator system for operating a plurality of cars past a floor, a plurality of signal devices at the floor, one for each car, a plurality of means for registering calls to stop the cars at that floor, one for each car, means responsive to operation of the cars for rendering effective the registering means corresponding to the nearest approaching car and for rendering ineffective the registering means corresponding to the other cars, manually-operated means for transferring the registered call from a car to the next following car, and means responsive to the operation of the transfer means for immediately operating the signal device and the call registering means of the said next following car and for immediately cancelling the signal device and the registered call for the car from which the transfer is made.

22. In an elevator system for operating a plurality of cars past a floor, a plurality of means for registering stop calls, one registering means for each car, a stopping means for each car, each stopping means being responsive to the registration of a call for a car and the position of the car for stopping that car at the floor, a plurality of signal devices at the floor, one for each car, each signal means being responsive to the registration of a call for its car for indicating that the call has been registered and that the car corresponding to the registering means will stop at the floor, means responsive to the operation of the cars for rendering effective the registering means corresponding to the nearest approaching car and for rendering the other registering means ineffective, manually operated means for immediately transferring a call registered by an effective registering means for one car to the registering means of the next following car and to cause the last named registering means to immediately operate the signaling device of the next following car and to stop that car when it arrives at the floor and to immediately cancel the signal device of the car for which the call was first registered.

23. In an elevator system for operating a plurality of cars past a floor, a car stopping means for each car, means at the floor for registering calls for operating the stopping means to stop the cars at the floor, a plurality of signal devices at the floor one for each car, a manually operated bypassing means on each car for preventing that car from stopping at the floor in answer to a registered stop call, and means responsive to operation of the by-passing means on a car for immediately operating the signal device of the next following car to indicate to the waiting passenger that said following car will stop and for immediately rendering inoperative the signal device of the car of the operated bypassing means.

24. In an elevator system for operating a plurality of cars past a floor, a plurality of control devices at the floor, one for each car, a plurality of signal devices at the floor, one for each car, means responsive to the position of the cars for projecting one of the control devices and means responsive to the operation of a projected control device for operating the signal device of the car corresponding to the projected control device.

25. In an elevator system for operating a plurality of cars past a plurality of floors, an up signal device and a down signal device for each car at each floor, an up control device and a down control device for each car at each floor, means responsive to the position of the cars for projecting the control device at each floor for the nearest approaching car in the corresponding direction, and means responsive to operation of a projected control device for immediately operating the signal device corresponding to the desired direction for the car corresponding to the operated control device.

HAROLD W. WILLIAMS.
EDGAR M. BOUTON.